United States Patent
Araki et al.

(10) Patent No.: US 7,016,081 B2
(45) Date of Patent: Mar. 21, 2006

(54) IMAGE DISTORTION CORRECTION APPARATUS, DISTORTION CORRECTION METHOD THEREFOR, RECORDING MEDIA, IMAGE SCANNER AND IMAGE CONSTRUCTION APPARATUS

(75) Inventors: Tadashi Araki, Kanagawa (JP); Guan Haike, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 967 days.

(21) Appl. No.: 10/012,470

(22) Filed: Dec. 12, 2001

(65) Prior Publication Data
US 2002/0084978 A1  Jul. 4, 2002

(30) Foreign Application Priority Data

| Dec. 14, 2000 | (JP) | ............................. 2000-379895 |
| Mar. 30, 2001 | (JP) | ............................. 2001-101279 |
| Dec. 7, 2001 | (JP) | ............................. 2001-374490 |

(51) Int. Cl.
*G06K 15/00* (2006.01)

(52) U.S. Cl. .................... 358/3.26; 358/488; 358/504; 358/516; 382/275; 382/286; 382/293

(58) Field of Classification Search .............. 358/3.26, 358/488, 474, 504, 452, 497; 382/154, 102, 382/275, 286, 293
See application file for complete search history.

(56) References Cited

U.S. PATENT DOCUMENTS

| 5,726,775 A | * | 3/1998 | Walsh ......................... 358/488 |
| 6,075,623 A | * | 6/2000 | Yun ............................. 358/486 |
| 6,385,347 B1 | * | 5/2002 | Matsuda ..................... 382/263 |
| 6,687,420 B1 | * | 2/2004 | Matsuda et al. ............ 382/286 |
| 2001/0046322 A1 | * | 11/2001 | Saiga .......................... 382/198 |
| 2003/0123732 A1 | * | 7/2003 | Miyazaki et al. ........... 382/186 |

FOREIGN PATENT DOCUMENTS

| EP | 0 434 415 A2 | 6/1991 |
| EP | 0 702 320 A1 | 3/1996 |
| EP | 0 762 326 A2 | 3/1997 |
| EP | 1 032 191 A2 | 8/2000 |
| JP | 11-41455 | 2/1999 |

OTHER PUBLICATIONS

Wada et al., "Shape From Shading With Interreflections Under A Proximal Light Source: Distortion-Free Copying Of An Unfolded Book", International Journal Of Computer Vision, 24(2), pp125-135 (1997).
Ukida et al., "Recovering 3D shape Of Unfolded Book Surface From A Scanner Image Using Eigenspace Method"; IEICE Technical Report, PRMU99-91, pp23-30, Oct. 1999.

* cited by examiner

*Primary Examiner*—Kimberly Williams
*Assistant Examiner*—Negussie Worku
(74) *Attorney, Agent, or Firm*—Dickstein Shapiro Morin & Oshinsky LLP

(57) ABSTRACT

The present invention provide an image distortion correction apparatus comprising a circumscribed rectangle extraction unit which extracts a circumscribed rectangle for each character in a distorted image scanned by an image reading unit to read an original placed on a reference plane, a character string extraction unit which extracts character strings using said circumscribed rectangles extracted by said circumscribed rectangle extraction unit, a distance estimation unit which estimates a distance between said reference plane and said original using said character strings and an image distortion correction unit which corrects said distorted image based on said distance between said reference plane and said original estimated by said image distortion correction unit.

30 Claims, 22 Drawing Sheets

SUB SCANNING DIRECTION

RESULT OF CIRCUMSCRIBED RECTANGLE
AND STRING EXTRACTION

EXTRACTED LINE USING HOUGH TRANSFORMATION

EXTRACTED CURVE USING LEAST SQUARE METHOD

SURFACE OF SCANNER

OUTLINE OF BOOK

IMAGE DISTORTION CORRECTION APPARATUS, DISTORTION CORRECTION METHOD THEREFOR, RECORDING MEDIA, IMAGE SCANNER AND IMAGE CONSTRUCTION APPARATUS

BACKGROUND OF THE INVENTION

1. Field of the Invention

The present invention generally relates to an image processing apparatus, and more particularly to an image distortion correction apparatus, an image distortion correction method therefor, recording media, an image scanner and an image construction apparatus, in which a distorted part of a scanned image is corrected.

2. Description of the Related Art

When a book type original, for example, a book or a booklet, is copied or scanned, it is hard to keep a binding part of the book on a focus plane of a copier or a scanner. The binding part of the book type original is separated from the focus plane of a copier or a scanner. This causes a copied or scanned image to be distorted and sharpness of characters on the copied or scanned image is reduced. The distorted part of the copied or scanned image is hard to read and, furthermore, a character recognition rate of an OCR (optical character reader) becomes very low. Above all, the thicker the book is, the harder it is to read the copied or scanned image. On the other hand, if the book is pressed to the focus plane, the book may be damaged.

To address this problem, therefore, a method to correct a distorted image has been proposed, in which method a three dimensional shape of an object is estimated based on density information of the image. An example of that method is described in a publication of T. Wada, H. Uchida and T. Matuyama, "Shape from Shading with Interreflection under a Proximal Light Source: Distortion-Free Copying of an Unfolded Book", International Journal Computer Vision 24(2), 125–135(1997) and the representative method of shape from shading is further described in a publication of Hiroyuki Ukita and Katsunobu Konishi, "Three dimensional shape recovery for a booklet surface using intrinsic space method", IECE technical report, PRMU99–91, pp. 23–30, October, 1999.

Further, a method is proposed in the laid-open Japanese patent application number 11-41455, in which method a three dimensional shape of an object is estimated based on an outline of a scanned image.

However, it is hard to put the method called the shape from shading into practical use because the method requires significant computational steps, and therefore requires a computational time of long duration.

On the other hand, a method described in the laid-open Japanese patent application number 11-41455 only requires a few computational steps to correct the distorted image, however, it is difficult to sufficiently correct the distorted image using this method when the whole outline of the booklet is not fully captured.

SUMMARY OF THE INVENTION

It is a general object of the present invention to provide an image distortion correction apparatus, which is able to correct a distorted image and requires a few computational steps even if the whole outline of a booklet is not fully captured.

The above objects of the present invention are achieved by an image distortion correction apparatus comprising:

a circumscribed rectangle extraction unit which extracts a circumscribed rectangle for each character in a distorted image scanned by an image reading unit from an original book placed on a reference plane;

a character string extraction unit which extracts character strings using the circumscribed rectangles extracted by the circumscribed rectangle extraction unit;

a distance estimation unit which estimates a distance between the reference plane and the original book containing the character strings; and an image distortion correction unit which corrects the distorted image based on the distance between the reference plane and the original, estimated by the image distortion correction unit.

According to the invention, the character strings are extracted from the scanned image read by an image reading unit. Then, a three dimensional shape (including a distance between the reference plane and the original) of the original, estimated based on the character strings and the image distortion, is corrected. As a result, even if the whole outline of the booklet is not fully captured, it is possible to sufficiently correct the distorted image with a few computational steps according to the present invention.

The above objects of the present invention are achieved by the image distortion correction apparatus further comprising:

an original distinction unit, which decides whether the original is written horizontally or vertically, and in case wherein the original distinction unit decides that the original is written in the horizontal, the distance estimation unit first selects character strings each of which has a length longer than a length equal to a predetermined ratio multiplied by the length of the longest string out of a plurality of character strings in the distorted image, then, selects one string having the largest curvature out of the selected character strings for a reference character string, and then, estimates a distance between the reference plane and the original using the reference character string.

According to the invention, it is possible to select a reference character string so that the distance between the reference plane and the original can be adequately estimated.

The above objects of the present invention are achieved by the image distortion correction apparatus, wherein the curvature is measured based on a location of center coordinates in a main scanning direction of the circumscribed rectangles in the character string, and the larger a difference between a maximum value of the center coordinates and a minimum value of the center coordinates, the larger is the curvature.

According to the present invention, it is possible to select the string having the largest curvature.

The above objects of the present invention are achieved by the image distortion correction apparatus further comprising:

an original distinction unit which decides whether the original is written horizontally or vertically, and in case wherein the original distinction unit decides that the original is written in the vertical, the character string extraction unit extracts a reference character string using circumscribed rectangles either at a top of or at a bottom of each vertical line, the distance estimation unit estimates a distance between the reference plane and the original using the reference string.

According to the invention, it is possible to select a reference character string so that the distance between the reference plane and the original can be adequately estimated.

The above objects of the present invention are achieved by the image distortion correction apparatus, wherein the distance estimation unit measures both a first distance D1 between a prolonged line of a straight line part in the reference character string and a curve part in the reference character string and a second distance D2 between an imaging center straight line and the curve part in the reference character string, and estimates a distance D between the reference plane and the original based on $$D=R \times (D1/D2),$$

where R is a distance between the reference plane and a center of a lens.

According to the present invention, the distortion is adequately measured and the three dimensional shape is properly estimated.

The above objects of the present invention are achieved by the image distortion correction apparatus, wherein the distance estimation unit independently estimates each distance between the reference plane and the original for a left page and a right page.

According to the present invention, in a case that each distance between the reference plane and the original for a left page and a right page has different value because, for example, the pages near the first or last page of the original are copied, each distance is independently estimated so that the distortion for each page is properly corrected.

an image distortion correction apparatus comprising:

a ruled line extraction unit which extracts ruled lines in a distorted image scanned by an image reading unit to read an original placed on a reference plane;

a distance estimation unit which estimates a distance between the reference plane and the original using the ruled lines; and an image distortion correction unit which corrects the distorted image based on the distance between the reference plane and the original estimated by the image distortion correction unit.

According to the present invention, the ruled lines are extracted from the scanned image read by an image reading unit. Then, a three dimensional shape (incorporating a distance between the reference plane and the original) of the original is estimated based on the ruled lines and the image distortion is corrected based on the estimated three dimensional shape of the original. As a result, even if the whole outline of the booklet is not fully captured, it is possible to sufficiently correct the distorted image with a few computational steps according to the present invention.

The above objects of the present invention are achieved by the image distortion correction apparatus further comprising:

an original distinction unit which decides whether the original is written horizontally or vertically, wherein in case that the original distinction unit decides that the original is written in the horizontal, the distance estimation unit first, selects ruled lines each of which has a length longer than a length of a predetermined ratio to that of the longest ruled line out of a plurality of ruled lines in the distorted image, then, selects one ruled line placed nearest an upper edge or a lower edge of the scanned image out of the selected ruled lines for a reference ruled line, and then, estimates a distance between the reference plane and the original using the reference ruled line.

According to the present invention, it is possible to select an adequate ruled line string so that the distance between the reference plane and the original is adequately estimated.

The above objects of the present invention are achieved by the image distortion correction apparatus, wherein the distance estimation unit measures both a first distance D1 between a prolonged line of a line part in the reference ruled line and a curve part in the reference ruled line and a second distance D2 between an imaging center line and the curve part in the reference ruled line, and estimates a distance D between the reference plane and the original based on $$D=R \times (D1/D2),$$

where R is a distance between the reference plane and a center of a lens.

According to the present invention, the distortion is adequately measured and the three dimensional shape is properly estimated.

The above objects of the present invention are achieved by the image distortion correction apparatus, wherein the distance estimation unit independently estimates each distance between the reference plane and the original for a left page and a right page.

According to the present invention, in case that each distance between the reference plane and the original for a left page and a right page has different value because, for example, the pages near the first or last page of the original are copied, each distance is independently estimated so that the distortion for each page is properly corrected.

The above objects of the present invention are achieved by a computer readable recording media having a program to execute an image distortion correction method, the program comprising steps of:

a circumscribed rectangle extraction step for extracting a circumscribed rectangle for each character in a distorted image scanned by an image reading step to read an original placed on a reference plane;

a character string extraction step for extracting character strings using the circumscribed rectangles extracted by the circumscribed rectangle extraction step;

a distance estimation step for estimating a distance between the reference plane and the original using the character strings; and an image distortion correction step for correcting the distorted image based on the distance between the reference plane and the original estimated by the image distortion correction step.

According to the present invention, the character strings are extracted from the scanned image read by an image reading unit. Then, a three dimensional shape (a distance between the reference plane and the original) of the original is estimated based on the character strings and the image distortion is corrected based on the three dimensional shape of the original. As a result, even if the whole outline of the booklet is not fully captured, it is possible to sufficiently correct the distorted image with a few computational steps according to the present invention.

The above objects of the present invention are achieved by the computer readable recording media further comprising:

an original distinction step which decides whether the original is written horizontally or vertically, wherein in case that the original distinction unit decides that the original is written in the horizontal, the distance estimation step first, selects character strings each of which has a length longer than a length of a predetermined ratio to that of the longest string out of a plurality of character strings in the distorted image, then, selects one string having the largest curvature out of the selected character strings for a reference character string, and then, estimates a distance between the reference plane and the original using the reference string.

According to the present invention, it is possible to select an adequate reference character string so that the distance between the reference plane and the original is adequately estimated.

The above objects of the present invention are achieved by the computer readable recording media, wherein the curvature is measured based on a location of a center coordinates in a main scanning direction of the circumscribed rectangle in the character string, and the larger a difference between a maximum value of the center coordinates and a minimum value of the center coordinates, the larger the curvature is.

According to the present invention, it is possible to select the string having the largest curvature.

The above objects of the present invention are achieved by the computer readable recording media further comprising:

an original distinction step for deciding whether the original is written horizontally or vertically, wherein in case that the original distinction unit decides that the original is written in the vertical, the character string extraction step extracts a reference character string using circumscribed rectangles either at a top of or at a bottom of each vertical line, the distance estimation step estimates a distance between the reference plane and the original using the reference string.

According to the present invention, it is possible to select an adequate reference character string so that the distance between the reference plane and the original is adequately estimated.

The above objects of the present invention are achieved by the computer readable recording media, wherein the distance estimation step measures both a first distance D1 between a prolonged line of a line part in the reference character string and a curve part in the reference character string and a second distance D2 between an imaging center line and the curve part in the reference character string, and estimates a distance D between the reference plane and the original based on $$D = R \times (D1/D2),$$

where R is a distance between the reference plane and a center of a lens.

According to the present invention, the distortion is adequately measured and the three dimensional shape is properly estimated.

The above objects of the present invention are achieved by the computer readable recording media, wherein the distance estimation step independently estimates each distance between the reference plane and the original for a left page and a right page.

According to the present invention, in case that each distance between the reference plane and the original for a left page and a right page has different value because, for example, the pages near the first or last page of the original are copied, each distance is independently estimated so that the distortion for each page is properly corrected.

The above objects of the present invention are achieved by a computer readable recording media having a program to execute an image distortion correction method, the program comprising steps of:

a ruled line extraction step for extracting ruled lines in a distorted image scanned by an image reading unit to read an original placed on a reference plane;

a distance estimation step for estimating a distance between the reference plane and the original using the ruled lines; and an image distortion correction step for correcting the distorted image based on the distance between the reference plane and the original estimated by the image distortion correction step.

According to the present invention, the ruled lines are extracted from the scanned image read by an image reading unit. Then, a three dimensional shape (a distance between the reference plane and the original) of the original is estimated based on the ruled lines and the image distortion is corrected based on the three dimensional shape of the original. As a result, even if the whole outline of the booklet is not fully captured, it is possible to sufficiently correct the distorted image with a few computational steps according to the present invention.

The above objects of the present invention are achieved by the computer readable recording media further comprising:

an original distinction step for deciding whether the original is written horizontally or vertically, wherein in case that the original distinction unit decides that the original is written in the horizontal, the distance estimation step first, selects ruled lines each of which has a length longer than a length of a predetermined ratio to that of the longest ruled line out of a plurality of ruled lines in the distorted image, then, selects one ruled line placed nearest an upper edge or an lower edge of the scanned image out of the selected ruled lines for a reference ruled line, and then, estimates a distance between the reference plane and the original using the reference ruled line.

According to the present invention, it is possible to select a ruled line string so that the distance between the reference plane and the original is adequately estimated.

The above objects of the present invention are achieved by the computer readable recording media, wherein the distance estimation step measures both a first distance D1 between a prolonged line of a line part in the reference ruled line and a curve part in the reference ruled line and a second distance D2 between an imaging center line and the curve part in the reference ruled line, and estimates a distance D between the reference plane and the original based on $$D = R \times (D1/D2),$$

where R is a distance between the reference plane and a center of a lens.

According to the present invention, the distortion is adequately measured and the three dimensional shape is properly estimated.

The above objects of the present invention are achieved by the computer readable recording media, wherein the distance estimation step independently estimates each distance between the reference plane and the original for a left page and a right page.

According to the present invention, in case that each distance between the reference plane and the original for a left page and a right page has different value because, for example, the pages near the first or last page of the original are copied, each distance is independently estimated so that the distortion for each page is properly corrected.

The above objects of the present invention are achieved by an image distortion correction method comprising steps of:

a circumscribed rectangle extraction step for extracting a circumscribed rectangle for each character in a distorted image scanned by an image reading step to read an original placed on a reference plane;

a character string extraction step for extracting character strings using the circumscribed rectangles extracted by the circumscribed rectangle extraction step;

a distance estimation step for estimating a distance between the reference plane and the original using the character strings; and an image distortion correction step for correcting the distorted image based on the distance between the reference plane and the original estimated by the image distortion correction step.

According to the present invention, the character strings are extracted from the scanned image read by an image reading unit. Then, a three dimensional shape (a distance between the reference plane and the original) of the original is estimated based on the character strings and the image distortion is corrected based on the three dimensional shape of the original. As a result, even if the whole outline of the booklet is not fully captured, it is possible to sufficiently correct the distorted image with a few computational steps according to the present invention.

The above objects of the present invention are achieved by an image distortion correction method comprising steps of:

a ruled line extraction step for extracting ruled lines in a distorted image scanned by an image reading unit to read an original placed on a reference plane;

a distance estimation step for estimating a distance between the reference plane and the original using the ruled lines; and an image distortion correction step for correcting the distorted image based on the distance between the reference plane and the original estimated by the image distortion correction step.

According to the present invention, the ruled lines are extracted from the scanned image read by an image reading unit. Then, a three dimensional shape (a distance between the reference plane and the original) of the original is estimated based on the ruled lines and the image distortion is corrected based on the three dimensional shape of the original. As a result, even if the whole outline of the booklet is not fully captured, it is possible to sufficiently correct the distorted image with a few computational steps according to the present invention.

The above objects of the present invention are achieved by an image scanner comprising:

an image reading unit to read an original placed on a reference plane; and an image distortion correction apparatus comprising;

a circumscribed rectangle extraction unit which extracts a circumscribed rectangle for each character in a distorted image scanned by the image reading unit;

a character string extraction unit which extracts character strings using the circumscribed rectangles extracted by the circumscribed rectangle extraction unit;

a distance estimation unit which estimates a distance between the reference plane and the original using the character strings; and an image distortion correction unit which corrects the distorted image based on the distance between the reference plane and the original estimated by the image distortion correction unit.

According to the present invention, the image scanner which sufficiently corrects the distorted image can be provided.

The above objects of the present invention are achieved by an image scanner comprising:

an image reading unit to read an original placed on a reference plane; and an image distortion correction apparatus comprising;

a ruled line extraction unit which extracts a ruled lines in a distorted image scanned by the image reading unit;

a distance estimation unit which estimates a distance between the reference plane and the original using the ruled lines; and an image distortion correction unit which corrects the distorted image based on the distance between the reference plane and the original estimated by the image distortion correction unit.

According to the present invention, the image scanner which sufficiently corrects the distorted image can be provided.

The above objects of the present invention are achieved by an image forming apparatus comprising:

an image reading unit to read an original placed on a reference plane;

an image distortion correction apparatus comprising;

a circumscribed rectangle extraction unit which extracts a circumscribed rectangle for each character in a distorted image scanned by the image reading unit;

a character string extraction unit which extracts character strings using the circumscribed rectangles extracted by the circumscribed rectangle extraction unit;

a distance estimation unit which estimates a distance between the reference plane and the original using the character strings; and an image distortion correction unit which corrects the distorted image based on the distance between the reference plane and the original estimated by the image distortion correction unit; and, a printing unit which prints the corrected image supplied from the image distortion correction apparatus on a paper.

According to the present invention, the image forming apparatus which sufficiently corrects the distorted image can be provided.

The above objects of the present invention are achieved by an image forming apparatus comprising:

an image reading unit to read an original placed on a reference plane;

an image distortion correction apparatus comprising;

a ruled line extraction unit which extracts ruled lines in a distorted image scanned by the image reading unit;

a distance estimation unit which estimates a distance between the reference plane and the original using the ruled lines; and an image distortion correction unit which corrects the distorted image based on the distance between the reference plane and the original estimated by the image distortion correction unit; and a printing unit which prints the corrected image supplied from the image distortion correction apparatus on a paper.

According to the present invention, the image forming apparatus which sufficiently corrects the distorted image can be provided.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Next, an embodiment according to the present invention will be explained with reference to FIG. 1 to FIG. 22. An image construction apparatus such as digital copy machine has an image distortion correction apparatus according to an embodiment of the present invention and an image scanner is a scanner part of the digital copy machine.

Figure 1:
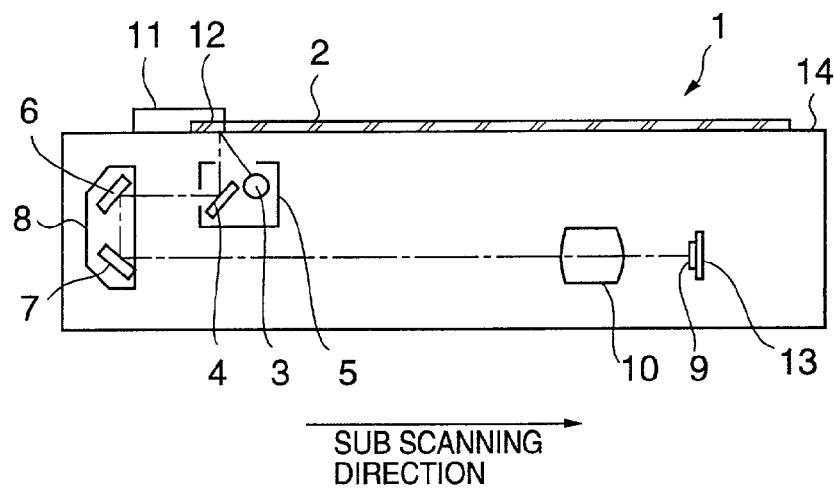
FIG. 1 shows a sectional diagram of a scanner part according to an embodiment of the present invention.

FIG. 1 shows a sectional diagram of a construction of a scanner part 1. As shown in FIG. 1, the scanner part 1 has a contact glass 2 on which an original is placed, a first travelling assembly 5 having an exposure lamp 3 which exposes the original 1, a first reflection mirror 4, a second travelling assembly 8 having a second reflection mirror 6 and a third reflection mirror 7, an imaging device 9 such as a CCD (a charge coupled device), a lens unit 10 which focuses the original on the imaging device 9, an original scale 11 which is a reference for the original and prevents the contact glass 2 from being detached, a white board 12 which corrects shading and is attached under the original scale 11, and a frame 14. The CCD 9 is formed on a sensor board 13.

The first travelling assembly 5 and the second travelling assembly 8 are driven by a stepping motor 24 (refer to FIG. 3) in the sub scanning direction when the original is scanned. The first travelling assembly 5 and the second travelling assembly 8 carry the exposure lamp 3 under the contact glass 2 and the original is exposed to light. The reflected light from the original 1 is reflected by the first reflection mirror 4, the second reflection mirror 6 and the third reflection mirror 7 and then, is focused on the CCD 9 through the lens unit 10.

Figure 2:
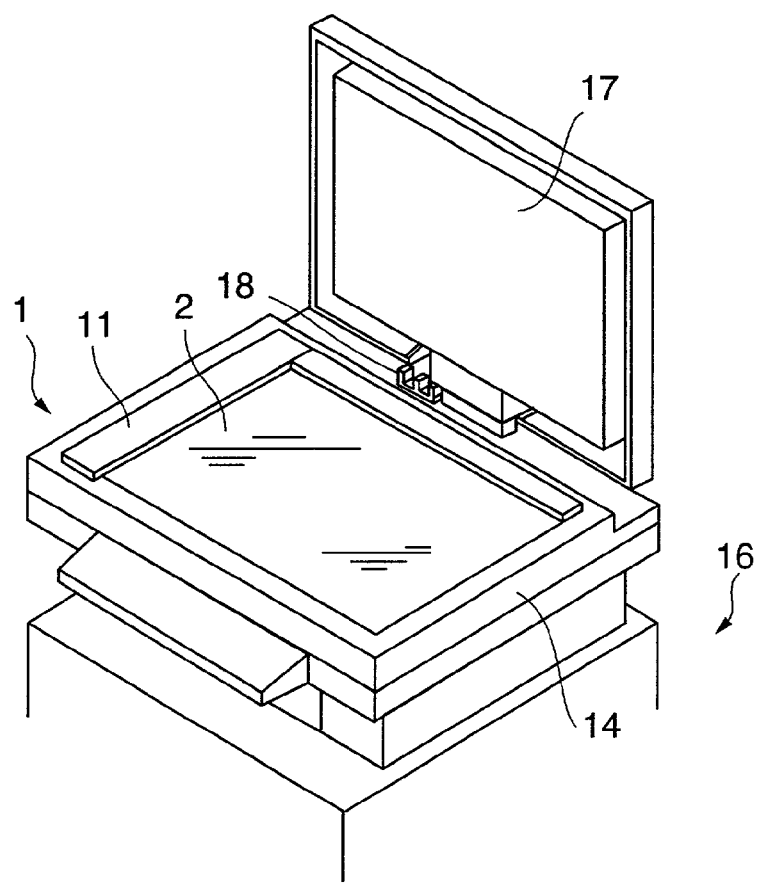
FIG. 2 shows a perspective view of an upper part of an digital copy machine equipped with the scanner part according to an embodiment of the present invention.

The scanner part 1 is provided to the digital copy machine 16 which has a printer part (not shown) as an image forming apparatus that forms an image on a paper using a electro photograph method according to the image data. FIG. 2 shows a perspective view of an upper part of the digital copy machine 16 equipped with the scanner part 1. As shown in FIG. 2, an original cover 17 which can be opened and closed against the contact glass 2 and an open and close sensor 18 of the original cover 17 are provided to the scanner part 1. Alternative printers which employ various kinds of printing method, such as an electro photograph method, an ink jet method, a dye sublimation thermoelectric method, a silver bromide photograph method, a direct thermal recording method and a melting thermoelectric method as well as the electro photograph method can be provided to the digital copy machine 16 as the printer. Explanations of these methods are omitted because these methods are well known to those who are skilled in the art.

Figure 3:
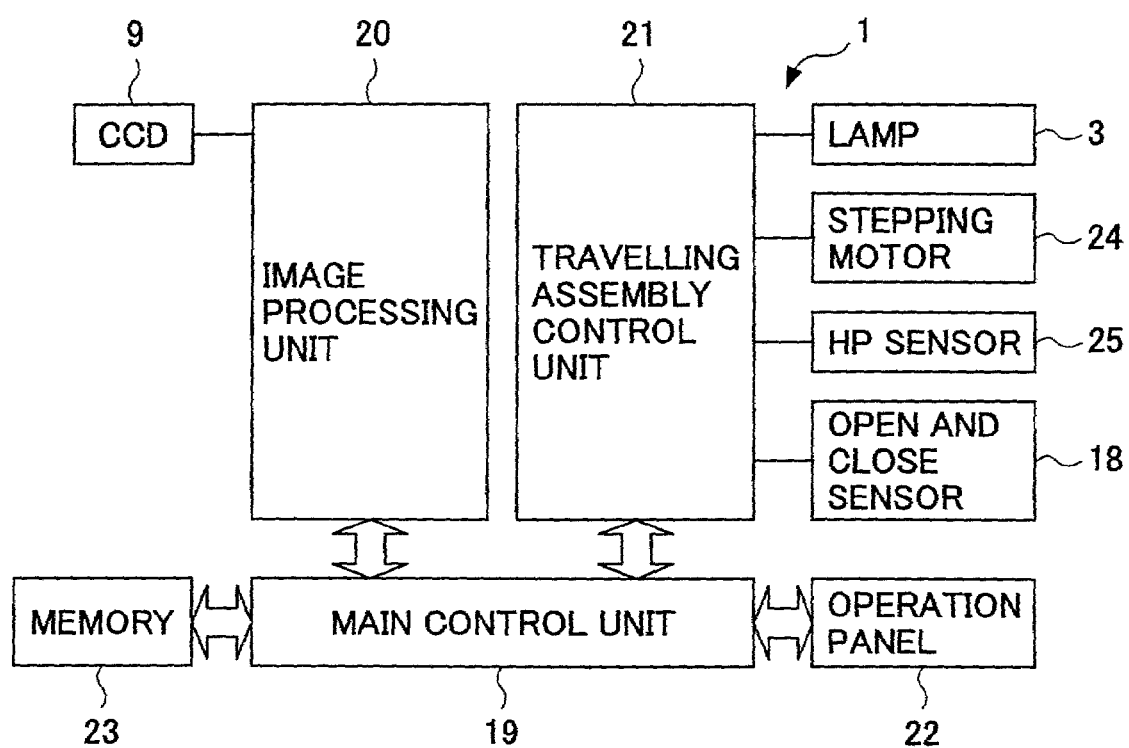
FIG. 3 shows an electrical block diagram of a control system of the scanner part.

FIG. 3 shows an electrical block diagram of a control system of the scanner part 1. In this control system, a main control unit 19 is connected to an image processing unit 20, a travelling assembly control unit 21, an operation panel 22 and a memory 23. The main control unit 19 controls the whole of the scanner 1. The image processing unit 20 processes image data captured by the CCD 9. The travelling assembly control unit 21 controls the first travelling assembly 5 and the second travelling assembly 8. The operation panel 22 receives commands supplied to the digital copy machine 16 and displays various kinds of messages. The memory 23 stores the image data captured by the CCD 9 and other predetermined data. On the operation panel 22, keys such as a copy start key which initiates copying, and so on are provided. The travelling assembly control unit 21 is connected to the exposure lamp 3, the stepping motor 24 which drives the first travelling assembly 5 and the second travelling assembly 8, a scanner home position sensor (an HP sensor) 25 which detects that the first travelling assembly 5 and the second travelling assembly 8 are placed at the home position and the open and close sensor 18.

Figure 4:
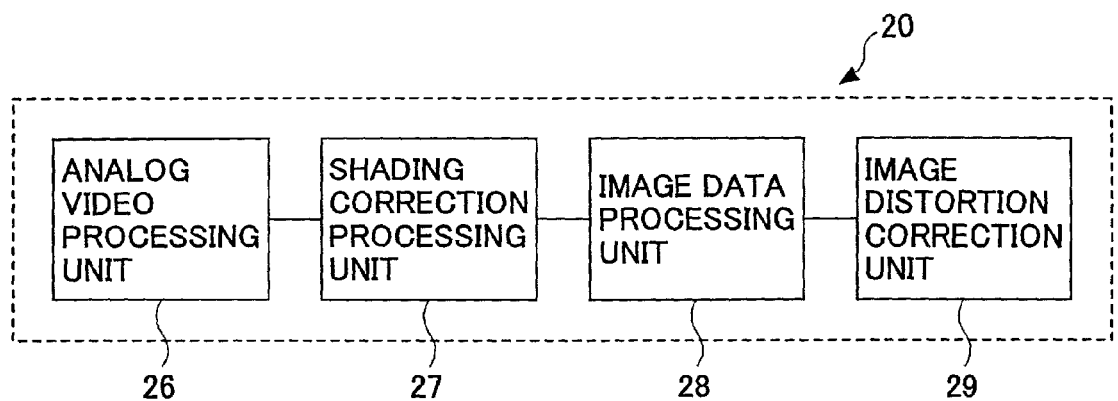
FIG. 4 shows a basic block diagram of an internal construction of an image processing unit.

FIG. 4 shows a basic block diagram of an internal construction of the image processing unit 20. As shown in FIG. 4, the image processing unit 20 has an analog video processing unit 26, a shading correction processing unit 27 for the shading correction, an image data processing unit 28 and an image distortion correction unit 29. The analog video processing unit 26 amplifies the image signal captured by the CCD 9 and converts the captured analog image into a digital image. The image data processing unit 28 performs an MTF correction, a scaling process and a γ correction to the shading corrected digital image and produces a scanned image. The image distortion correction unit 29 performs a distortion correction for the distorted image, which is a characteristic feature of the present invention. The image processed digital image is supplied to the printer part through the main control unit 19 and then is printed out.

Figure 5:
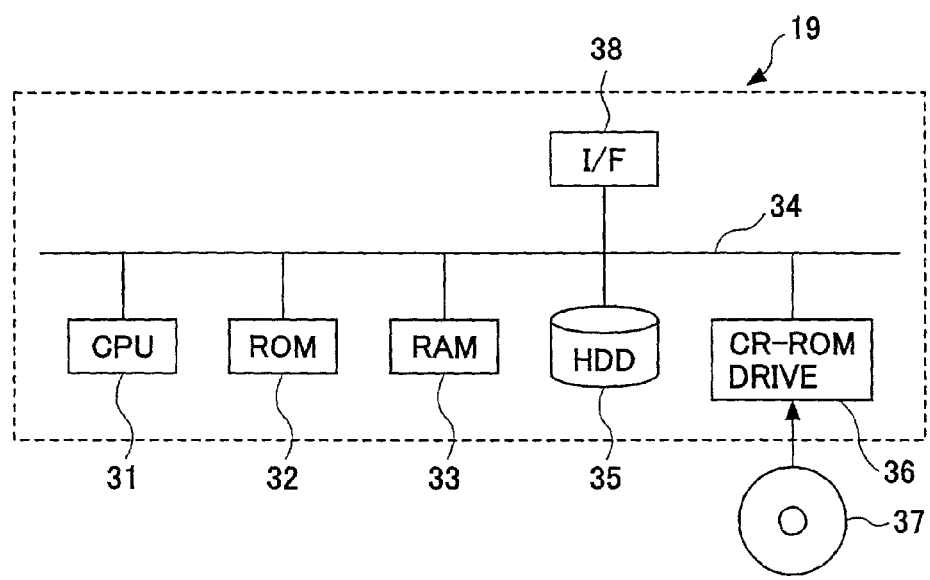
FIG. 5 shows an electrical block diagram of a main control unit.

FIG. 5 shows an electrical block diagram of the main control unit 19. As shown in FIG. 5, the main control unit 19 has a CPU (central processing unit) 31 which centrally controls components connected to it. This CPU 31 is connected to a ROM (read only memory) 32 which stores BIOS, and so on, a RAM (random access memory) 33 which serves as a work area for the CPU 31, and a bus 34. These components compose a micro computer. Further, the bus 34 is connected to a HDD which stores a control program, a CD-ROM (Compact Disc) drive 36 which reads a CD-ROM 37 and an interface (I/F) 38 through which the CPU 31 communicates with the printer part.

The CD-ROM 37 as shown in FIG. 5 is one of the recording media of the present invention and stores a predetermined control program. The CPU 31 reads the control program stored on the CD-ROM 37 through the CD-ROM drive 36 and then installs it to the HDD 35. This program enables the main control unit 19 to perform various processes which are described later.

Further, it is possible to use various kinds of optical discs such as DVD's, various kinds of magnet-optical discs, various kinds of magnet discs such as floppy discs, various kinds of semiconductor memories, and so on, as well as the CD-ROM 37 as the recording media. It is also possible to install the program, which is downloaded through networks such as the Internet, to the HDD 35. In this case, the recording media which store the programs on a server side are also the recording media according to the present invention. The program may be executed under a predetermined OS (Operating System) or the OS may execute a part of the processes in the program, as described later. Further, the program may be included in a group of program files which construct application programs such as word processing software and an operating system, and so on.

Processes which are executed by the CPU 31 provided in the main control unit 19 under the control of the control program, will be explained. First of all, a distortion correction process for a scanned image executed by the image distortion correction unit 29 will be explained. This process corrects the scanned and distorted image and is a characteristic function of the scanner part 1 according to the present invention.

Figure 6:
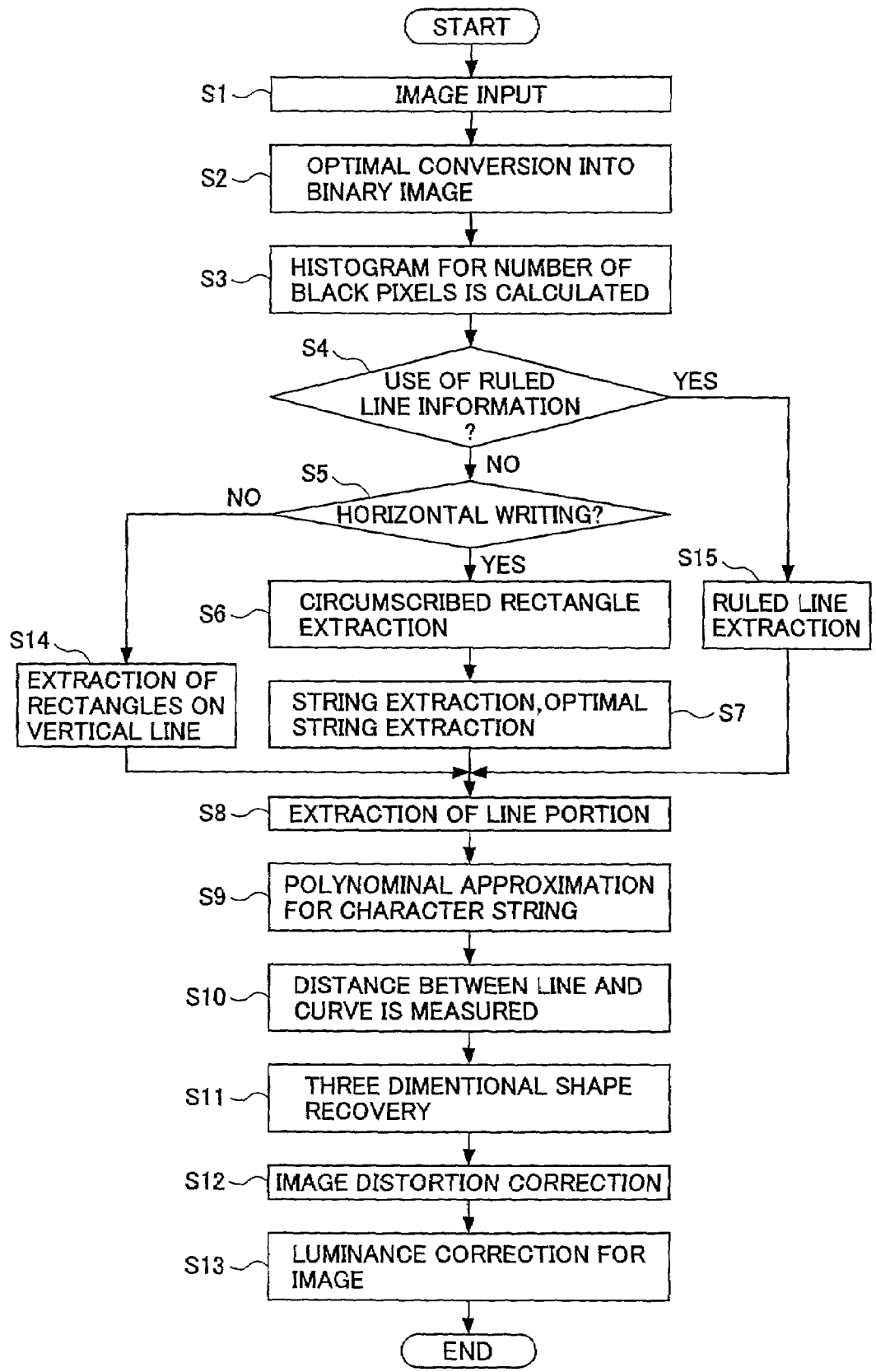
FIG. 6 shows a flow chart of an image distortion correction process for a scanned image according to the present invention.
Figure 7:
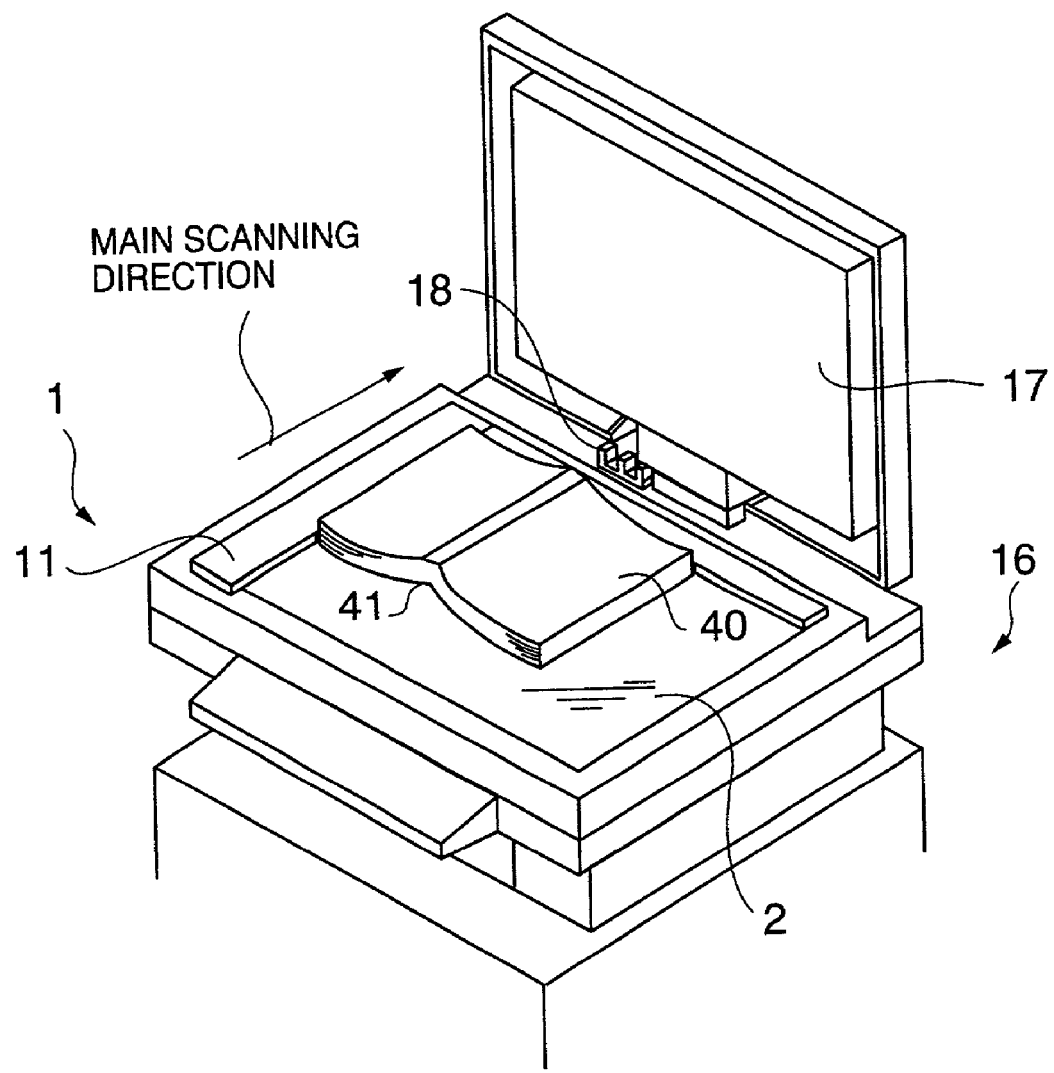
FIG. 7 shows a perspective view of the scanner, on a contact glass of which a book type original is placed.

FIG. 6 shows a schematic flow chart of the distortion correction process for the scanned image according to the present invention. FIG. 7 shows a perspective view of the scanner part, on a contact glass of which a book type original 40 is placed. The binding part 41 of the book type original 40 is placed on the contact glass 2 in parallel to a main scanning direction of the scanner part 1.

Figure 8:
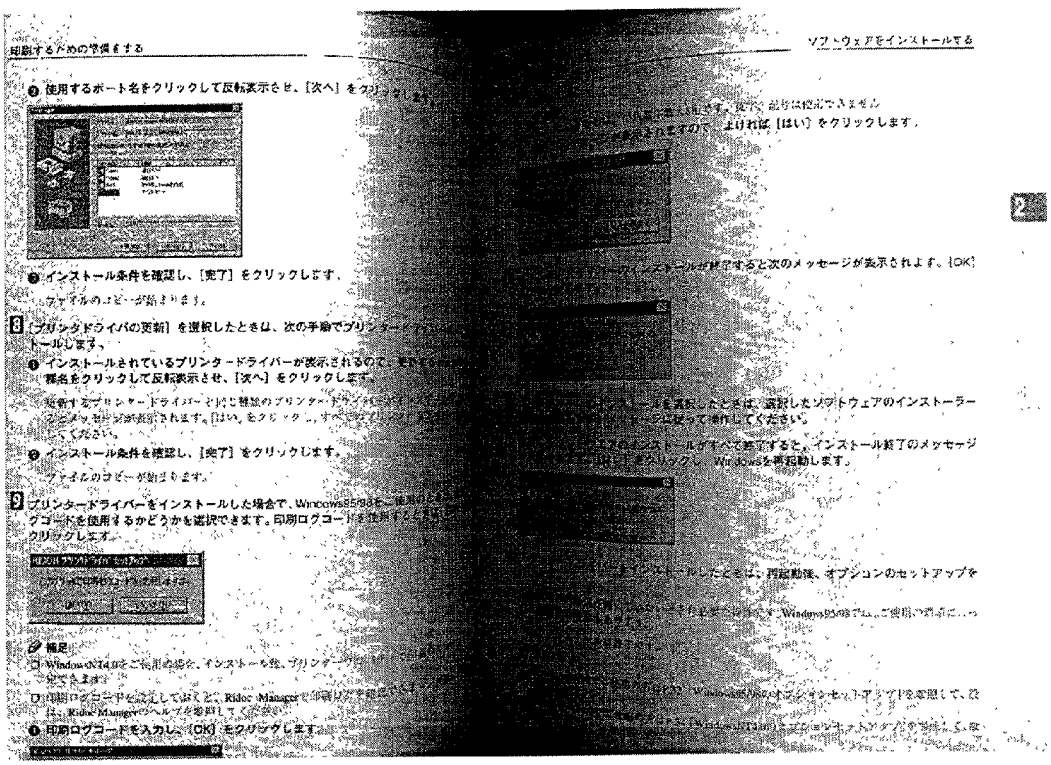
FIG. 8 shows an example of the scanned image.
Figure 9:
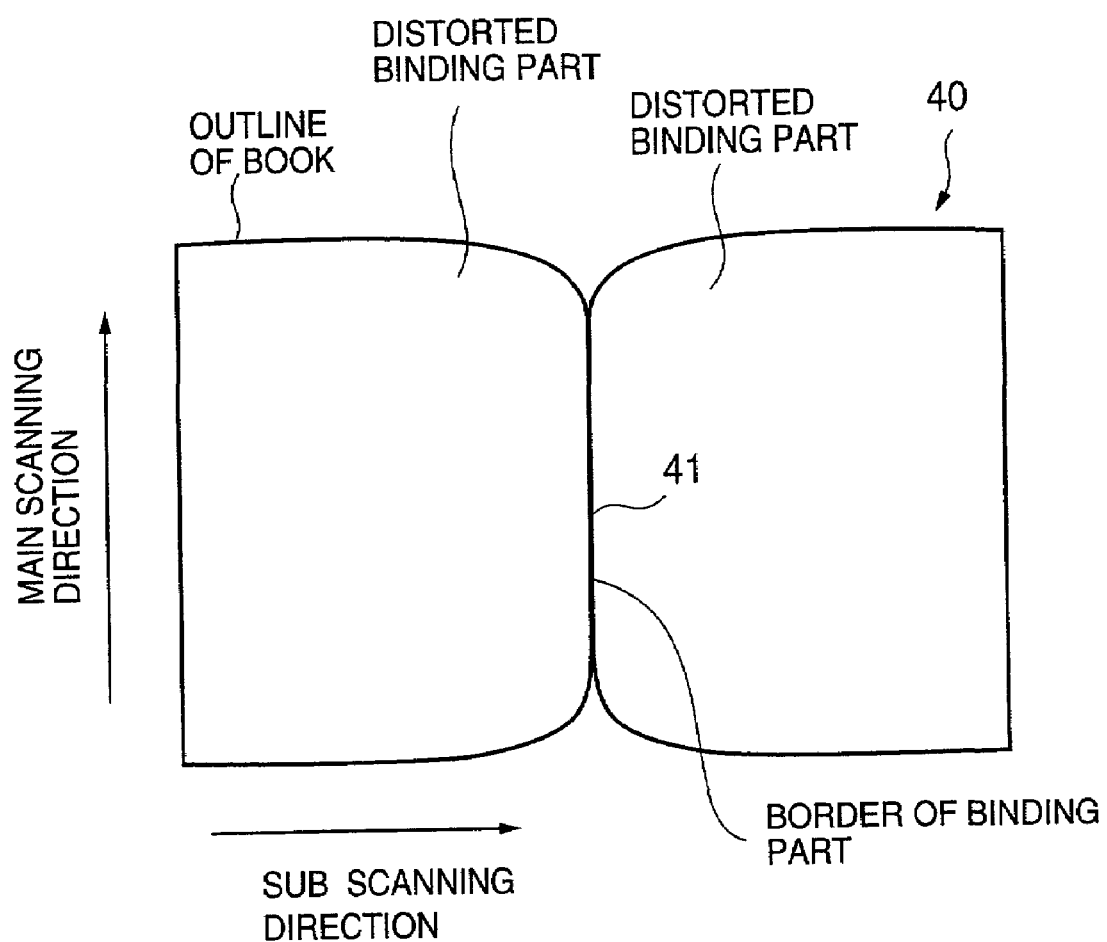
FIG. 9 shows a distorted part in the vicinity of a binding part of the book type original.

First, at a step S1, the scanned image of the book type original 40 on the contact glass 2 output from the image data processing unit 28 is supplied to the image distortion correction unit 29. FIG. 8 shows an example of the scanned image. FIG. 9 shows a distorted part in the vicinity of a binding part 41 of the book type original 40. As shown in FIG. 9, the scanned image has the distortion part in the vicinity of the binding part 41.

Figure 10:
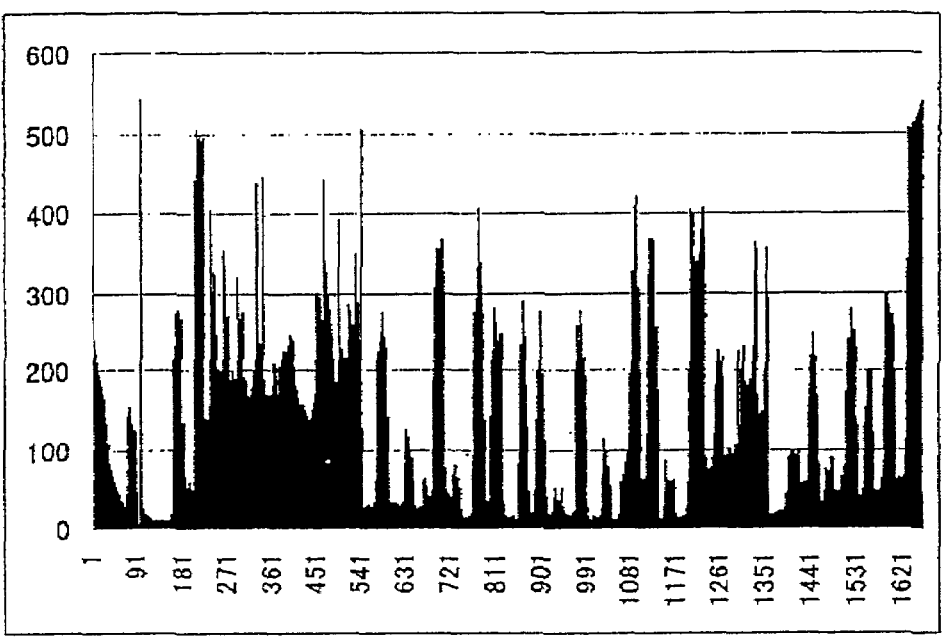
FIG. 10 shows a histogram of black pixels in the scanned image as shown in FIG. 8.

Next, at a step S2, the scanned image of the book type original 40, for example, a gray scale image, is optimally converted into a binary image. Then, at a step S3, a histogram of a number of black pixels in the sub scanning direction is calculated. The black pixel is a pixel with higher density than a predetermined density. FIG. 10 shows a histogram of the black pixels in the scanned image as shown in FIG. 8. A horizontal axis in FIG. 10 shows a position of the black pixel in the sub scanning direction, and a vertical axis in FIG. 10 shows the number of the black pixels.

Next, at a step S4, the process waits until an instruction is received, which shows whether the image distortion correction process is performed based on character information or ruled line information.

If the instruction received shows that the character information is used for the image distortion correction process (N at the step 4), then the process advances to a step 5. In the step 5, it is determined whether the characters in the book type original are written vertically or horizontally. This determination is done based on the histogram of the number of the black pixels in the sub scanning direction calculated in the step 3. For example, if the original is written in the horizontal as shown in FIG. 8, there exists a repetition pattern of peaks. On the other hand, in case of that the original is written in the vertical, there is no repetition pattern of the peaks. This characteristic enables to decide whether an original is written in horizontally or vertically.

If the scanned image is a color gray scale image, the conversion of the scanned image into the binary image is performed using one component among R (red), G (green) and B (blue) components, for example, the G component. In this case, the black pixel is a pixel of the G component with higher density than a predetermined density of the G component and the white pixel is a pixel of the G component with lower density than a predetermined density of the G component. It is also possible to decompose the RGB image into a luminance component and a chrominance component, and then the luminance component can be used to convert the scanned image into the binary image, as mentioned above.

Figure 11:
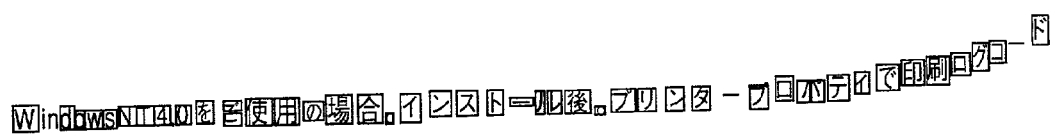
FIG. 11 shows a process to extract a circumscribed rectangle for each character.

In case that the original is written in the horizontal (Y at the step S5), a character string extraction process extracts a circumscribed rectangle for each character, which is a series of the black pixels, at a step 6. Then, at a step 7, a plurality of character strings are extracted and an optimal reference character string is selected among the character strings. An explanation of the character recognition process is omitted because it is well known. FIG. 11 shows an example of a result of the string extraction process to extract a circumscribed rectangle for each character and the selected optimal character string. The optimal character string is a string which has a length longer than a predetermined length and has the largest curvature among the plurality of character strings. For example, the string which has the length longer than the predetermined length is a string having a length longer than 80% of the longest string. An optimal character string is selected for each side of a border of the binding part 41 of the book type original 40. The curvature is measured based on a location of the center coordinates in the main scanning direction of the circumscribed rectangle in the character string. The larger a difference between the maximum value of the center coordinates and the minimum value of the center coordinates, the larger is the curvature.

Next, at a step S8, a line portion in the optimal reference character string selected at the step S7 is extracted. The extraction of the line portion in the optimal reference character string is performed using a Hough transformation of the center coordinates of each circumscribed rectangle.

Figure 12:
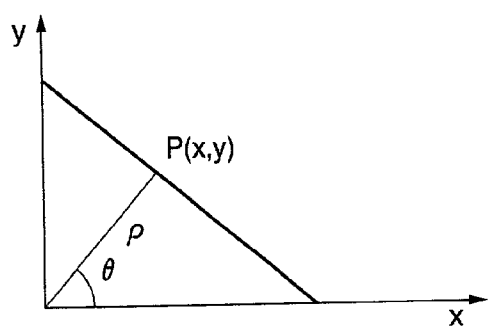
FIG. 12 shows a principle of a Hough transformation.
Figure 13:
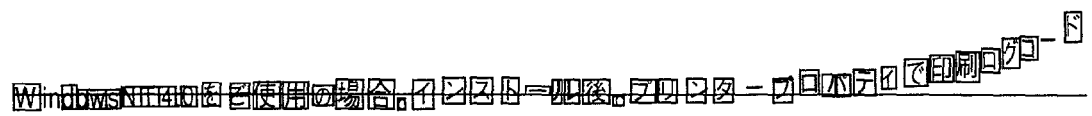
FIG. 13 shows an extracted line from the character string as shown in FIG. 11 using the Hough transformation.

A principal of the Hough transformation will be explained. FIG. 12 shows the principle of a Hough transformation. A line on a point P(x, y) satisfies the equation (1) as follows.

$$\rho = x \cdot \cos\theta + y \cdot \sin\theta \quad (1)$$

where (x, y) are the coordinates of the point P and $\rho$ is a distance between the origin and the point P. $\theta$ is an angle between a line segment PO and the x-axis. The center coordinates (xi, yi) of the rectangle are projected to ($\rho$, $\theta$) a discrete (meshed) parameter plane. A point (x, y) is projected to one curve on the ($\rho$, $\theta$) plane. A count value for each mesh on the curve is incremented. If there is a point having a large count value on the ($\rho$, $\theta$) plane, there exists a corresponding line on the (x, y) plane. Therefore, the line on the (x, y) plane can be extracted by means of finding a point having the largest count value on the ($\rho$, $\theta$) plane because there is only one line for each character string. This method is robust against a noise and, it is possible to extract a line even if a line and a curve co-exist. FIG. 13 shows an extracted line from the character string as shown in FIG. 11 using the Hough transformation.

Figure 14:
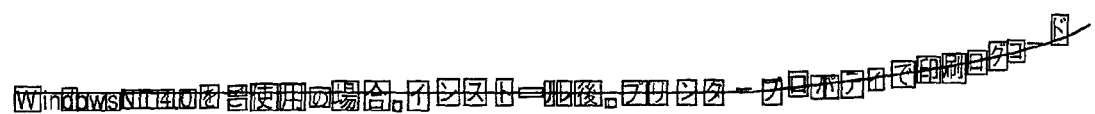
FIG. 14 shows an extracted curve from the character string as shown in FIG. 11 using the least square method.

Next, at a step S9, a curve part in the reference character string is extracted. The selected reference character string at the step S7 is approximated by a polynominal (2) and coefficients of the polynominal are calculated using the least square method. That is to say, the step S9 calculates an approximated curve for the selected reference character string.

$$Y = a_0 + a_1 x^1 + a_2 x^2 + \ldots + a_n x^n \quad (2)$$

where (x, y) are the center coordinates of the circumscribed rectangle and ($a_0$, $a_1$, $a_2$, . . . $a_n$) are the coefficients of the polynominal. FIG. 14 shows an extracted curve from the character string as shown in FIG. 11 using the least square method.

Figure 15:
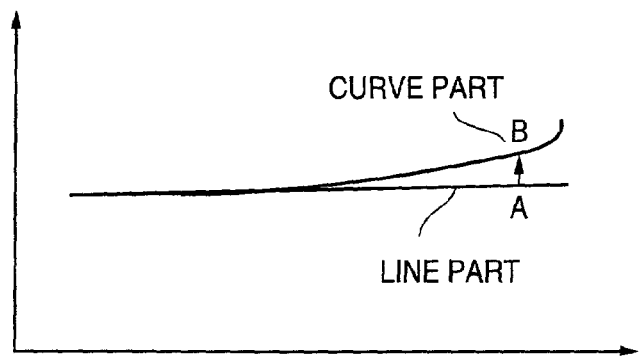
FIG. 15 shows a distance between the line and the curve of a reference character string.

Next, at a step S10, a distance between the line calculated at the step S8 and the curve calculated at the step S9 is measured. Then a three dimensional shape recovery is performed at a step S11. FIG. 15 shows the distance between the line and the curve in a reference character string.

Figure 16:
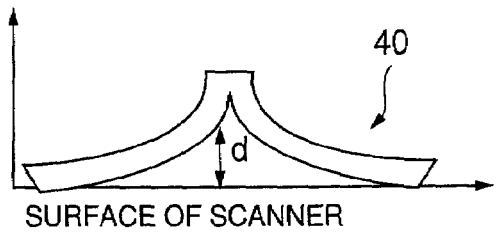
FIG. 16 shows a height between the a contact glass and the surface of a book type original.
Figure 17:
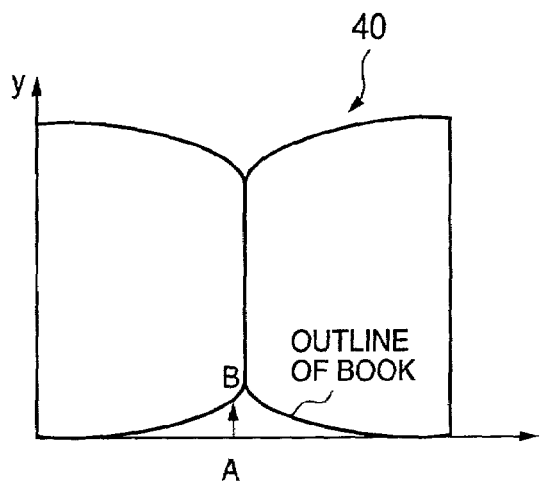
FIG. 17 shows a shrunk scanned image.

In case that the binding part 41 of the book type original 40 is placed on the contact glass 2 in parallel to a main scanning direction of the scanner part 1, the characteristics of the image formation system are as follows when the lens unit 10 is used to read the book type original 40. The image formation system uses a center projection in the main scanning direction and it uses a plain projection in the sub scanning direction. The three dimensional shape recovery uses these characteristics. FIG. 16 shows a height between the a contact glass 2 and the surface of a book type original. FIG. 17 shows a shrunk scanned image. As shown in FIG. 16 and FIG. 17, in a case of center projection, the greater the distance d between the contact glass 2 and the surface of a book type original 40 becomes, the lower the magnification of the image becomes. Therefore, upper and lower lines of an outline of the scanned image of the book type original 40 are curved to the inside as shown in FIG. 17. This means that it is possible to calculate a height d based on a measured value of the distance AB. As a result, it is possible to recover the three dimensional shape, that is to say, the distance d between the contact glass 2 and the surface of a book type original 40, based on the measured value of the distance AB.

Figure 18:
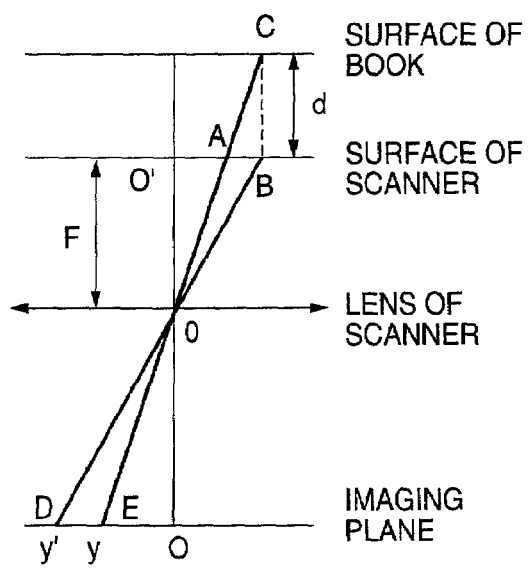
FIG. 18 shows an imaging of the book type original on an imaging plane through a scanner lens.

It is assumed that the book type original 40 is placed horizontally on the contact glass 2. Then, the three dimensional shape is observed as a two dimensional shape. FIG. 18 shows an imaging of the book type original 40 on an imaging plane through a scanner lens. A reference OO' shows an optical axis and a reference O shows a center of the lens. A reference F shows a distance between the contact glass 2 as a reference plane of the scanner and the center of the lens O and this distance is called a focal length of the scanner. A point B on the reference plane of the scanner forms an image D on the imaging plane. A point C on the book type original 40 separated from the reference plane of the scanner forms an image E on the imaging plane. A distances between the point E and the center O is y and a distances between the point D and the center O is y'. It is noted that the center of the lens is moved when the first travelling assembly 5 and the second travelling assembly 8 are moved in the sub scanning direction. We call the trace of the center of the lens an imaging center line. Relation among d, F, AB, AO', y and y' satisfy following equations (3) and (4) using the similar triangles.

$$d/F = AB/AO' \quad (3)$$

$$AB/AO' = (y'-y)/y \quad (4)$$

A distance d is obtained from the equations (3) and (4) based on a following equation (5).

$$d = F \times ((y'-y)/y) \quad (5)$$

The three dimensional shape can be obtained from the equation (5) based on the value (y'-y) which shows a two dimensional distortion value. In this embodiment, the dimensional distortion value (y'-y) and the distance y are obtained from the line part and curve part extracted from the reference character string as mentioned above or the ruled line. The focal length F is fixed to the scanner part 1 and is known value. A set value of the scanner part 1 or a calibrated value for the lens is used for the focal length F. The distance between the reference plane of the scanner and the surface of the book type original 40 is determined by means of the steps S8 to S11 as mentioned above.

Figure 19:
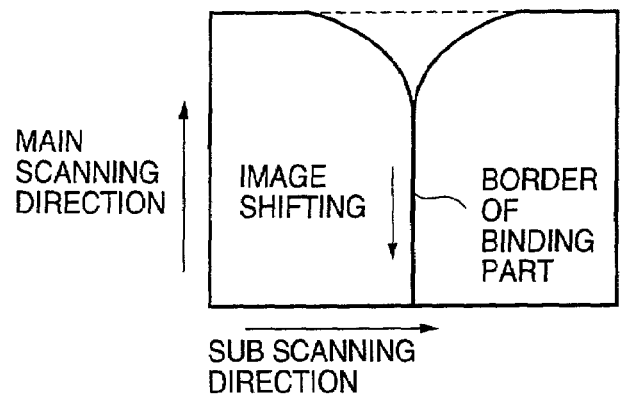
FIG. 19 shows a downward shift of a binding part in the scanned image of the book type original.

Next, at a step S12, a distortion correction of the scanned image is performed based on the three dimensional shape determined by the above steps. Then, at a step S13, the luminance of the corrected image is corrected. FIG. 19 shows a downward shift of a binding part in the scanned image of the book type original. The scanned image is shifted, row by row, downward in parallel to the binding part of the book original until the lower edge of the scanned image becomes straight. Then, a reduction ratio is calculated based on a distance between a dotted straight line and an upper curve edge of the scanned image and the scaling process is performed to the scanned image. Further, the scanned image is expanded in the sub scanning direction. Further, the luminance correction is performed for each pixel in each column based on the whitest pixel in the column. More details are described in the laid-open Japanese patent application number 11-41455. The image distortion correction is performed by means of the steps S12 and S13 mentioned above.

Figure 20:
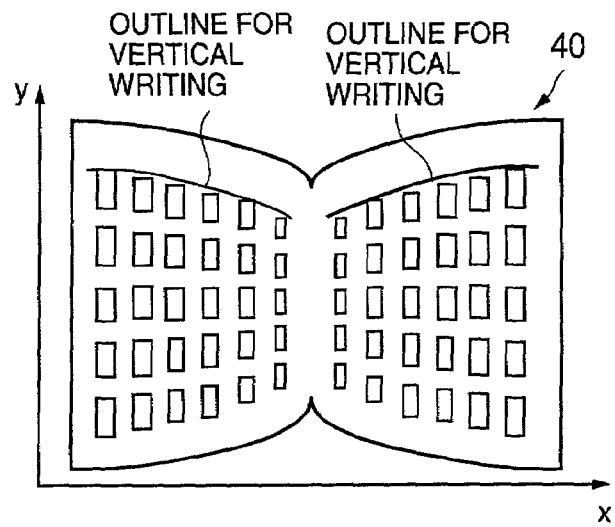
FIG. 20 shows a reference character string in an original which is written vertically.

Next, another embodiment of the present invention will be explained. FIG. 20 shows a reference character string in a case that an original is written in vertically. When it is determined that the character string in the original is written in the vertical at the step S5 (N), an extraction process of the circumscribed rectangle and an extraction process of the character string written vertically are performed at a step S14. A circumscribed rectangle at a top of or at a bottom of each vertical line is extracted and a reference character string is determined based on the circumscribed rectangles. Then, the envelope of the vertical lines is extracted based on the reference character string.

Next, at the step S8 to S13, the image distortion correction process is performed using the center coordinates of each circumscribed rectangle in the reference character string as mentioned above.

Figure 21:
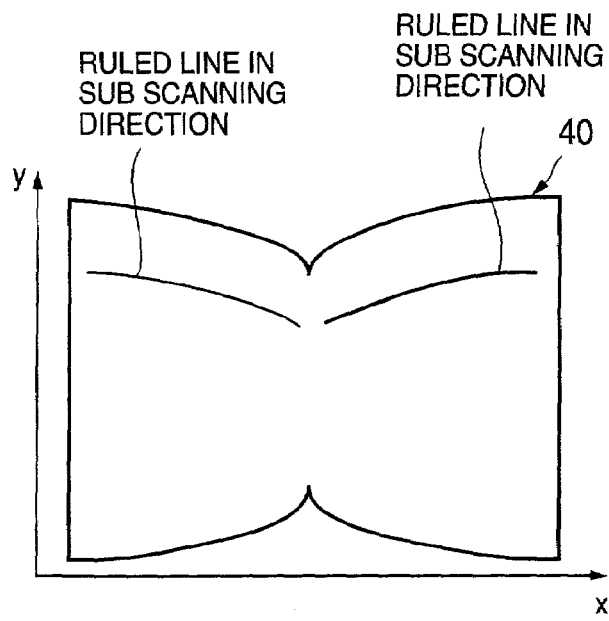
FIG. 21 shows an example of a ruled line in a sub scanning direction.

It is also possible to use ruled lines in the sub scanning direction to perform the image distortion correction process when the indication to select ruled line information is supplied at the step S4 (Y). At a step S15, the ruled line in the sub scanning direction is extracted. FIG. 21 shows an example of a ruled line in the sub scanning direction. The histogram of the black pixels in the sub scanning direction calculated at the step S3 is used at the step S15. AS shown in FIG. 21, when there are ruled lines in the scanned image, the histogram has narrow peaks. Therefore, the peaks are used to extract the ruled lines. The lines each of which has a length longer than a predetermined length are selected. For example, the ruled lines which have the length longer than the predetermined length are ruled lines having a length longer than 80% of the longest ruled line. Then, one line nearest the upper or lower edge of the scanned image is selected as a reference ruled line. The reference ruled line is selected for each side of a border of the binding part 41 of the book type original 40. Then, the same steps S8 to S13 as mentioned above follow the step 15.

Figure 22:
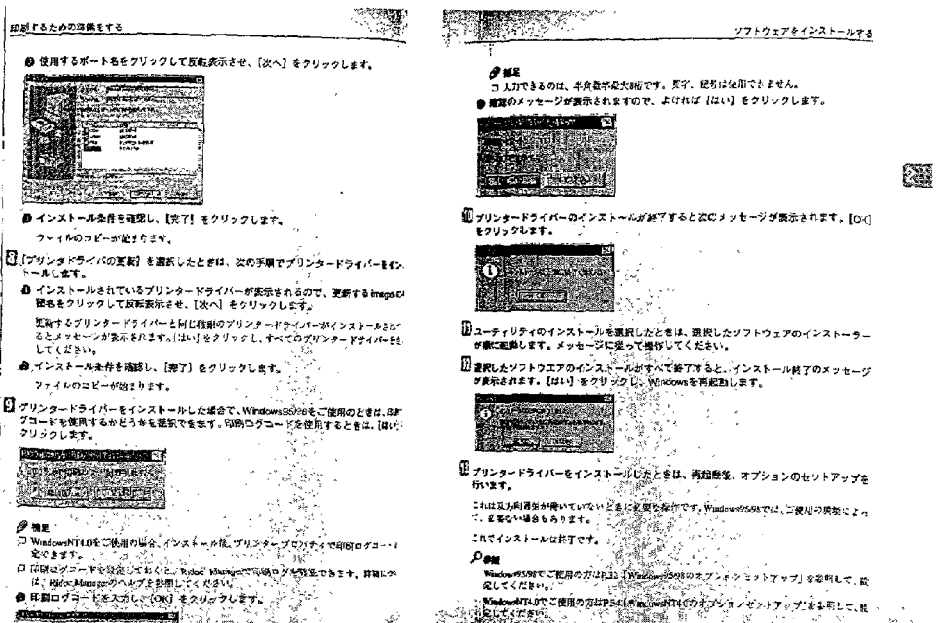
FIG. 22 shows an example of a corrected image of which distortion is corrected according to the present invention.

FIG. 22 shows an example of a corrected image of which distortion is corrected according to the embodiment of the present invention. As shown in FIG. 22, the distortion in the vicinity of the binding part 41 of the book type original 40 as shown in FIG. 8 is corrected.

Next, the embodiments for selection of the reference character string will be explained.

Figure 23:
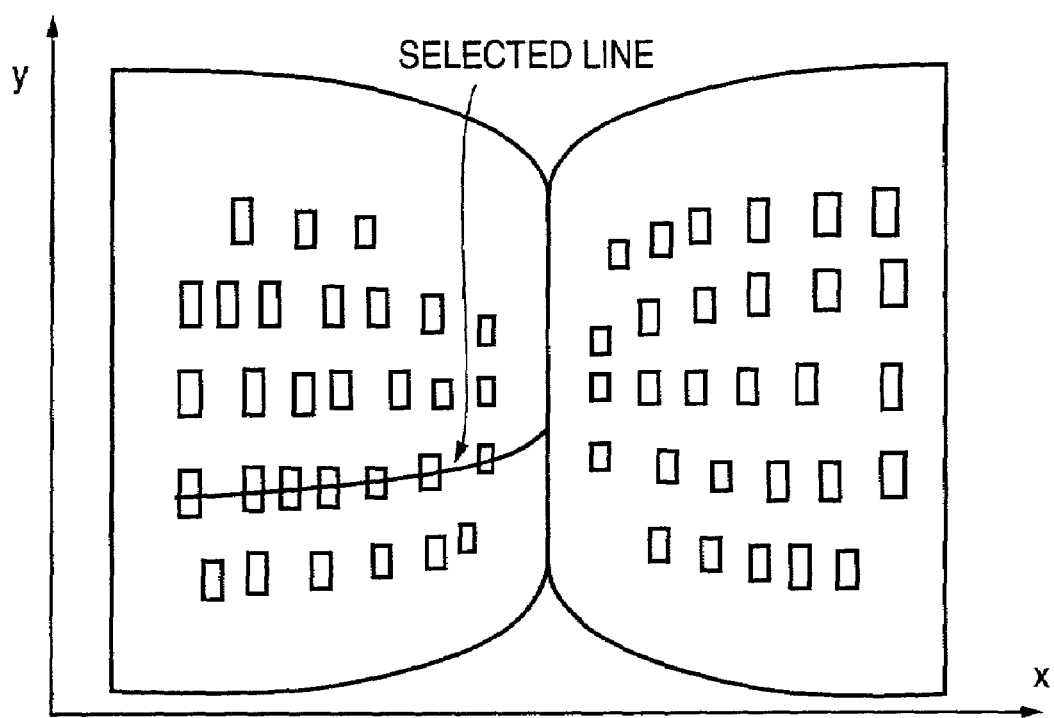
FIG. 23 shows the first embodiment of the selection of the reference character string according to the present invention.

FIG. 23 shows the first embodiment of the selection of the reference character string according to the present invention. In this embodiment, first, strings each of which has a length longer than a length of a predetermined ratio to that of the longest string are selected out of a plurality of character strings. Then, one string having the largest curvature out of the selected character strings is selected for the reference character string.

Figure 24:
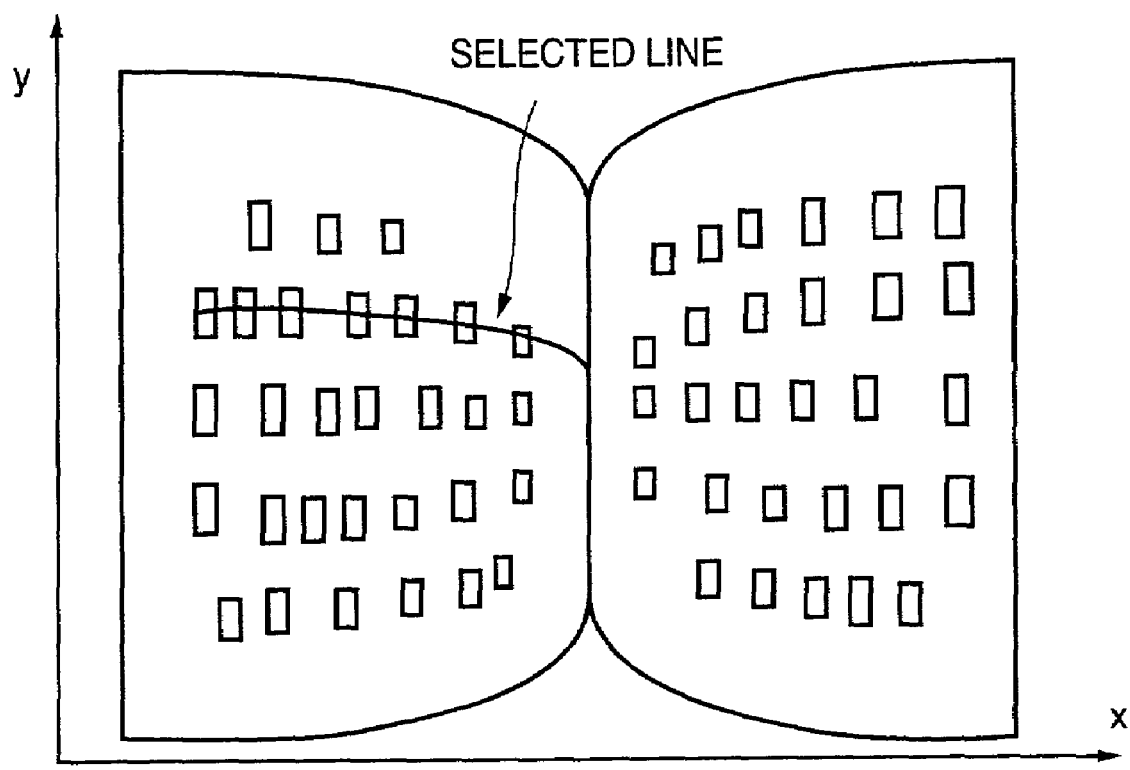
FIG. 24 shows the second embodiment of the selection of the reference character string according to the present invention.

FIG. 24 shows the second embodiment of the selection of the reference character string according to the present invention. In this embodiment, first, strings each of which has a length longer than a length of a predetermined ratio to that of the longest string are selected out of a plurality of character strings. Then, one string placed nearest the upper edge of the scanned image out of the selected character strings is selected for the reference character string.

Figure 25:
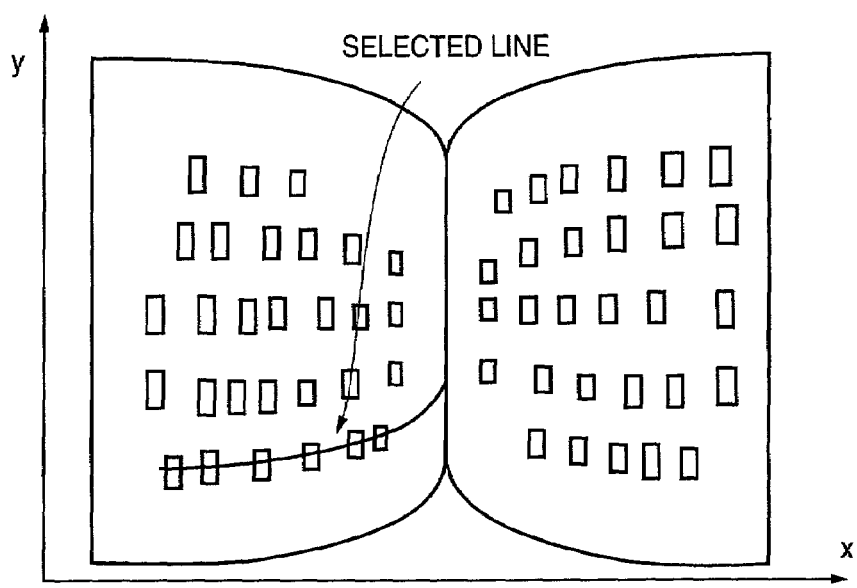
FIG. 25 shows the third embodiment of the selection of the reference character string according to the present invention.

FIG. 25 shows the third embodiment of the selection of the reference character string according to the present invention. In this embodiment, first, strings each of which has a length longer than a length of a predetermined ratio to that of the longest string are selected out of a plurality of character strings. Then, one string placed nearest the lower edge of the scanned image out of the selected character strings is selected for the reference character string.

Figure 26:
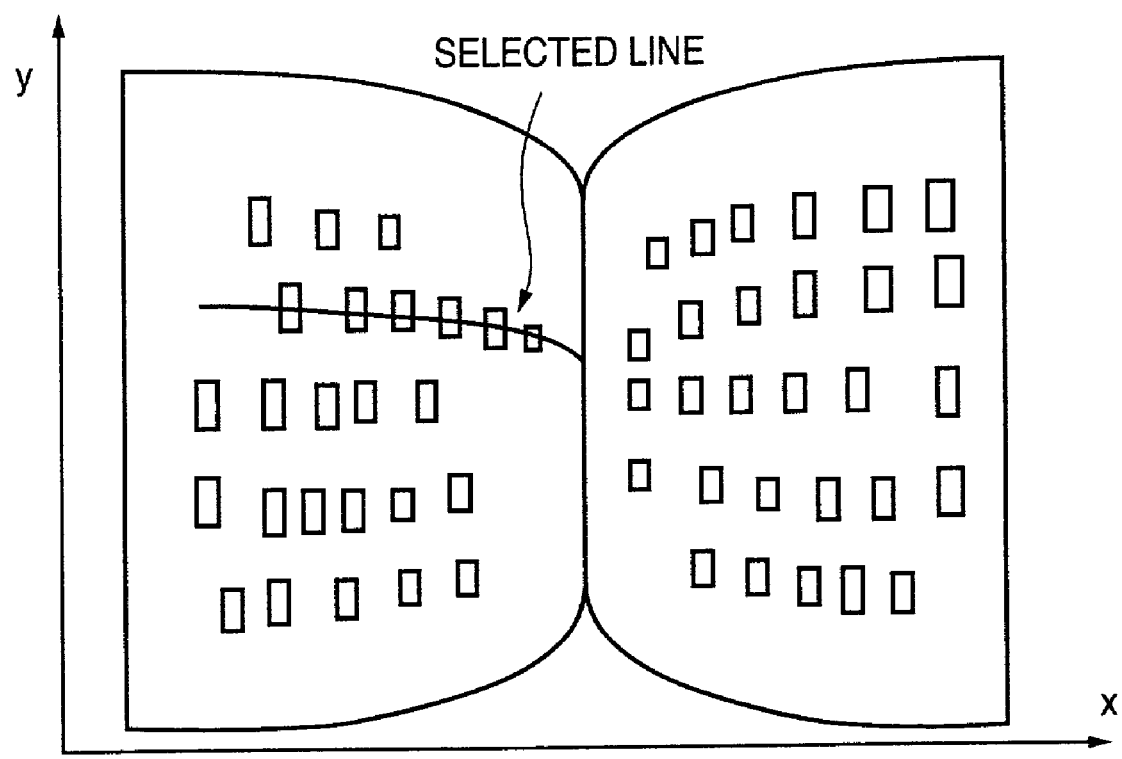
FIG. 26 shows the fourth embodiment of the selection of the reference character string according to the present invention.

FIG. 26 shows the fourth embodiment of the selection of the reference character string according to the present invention. In this embodiment, first, strings each of which has a length longer than a length of a predetermined ratio to that of the longest string are selected out of a plurality of character strings. Then, one string placed nearest the binding part of a book type original out of the selected character strings is selected for the reference character string.

Next, the embodiments for selection of the reference ruled line will be explained.

Figure 27:
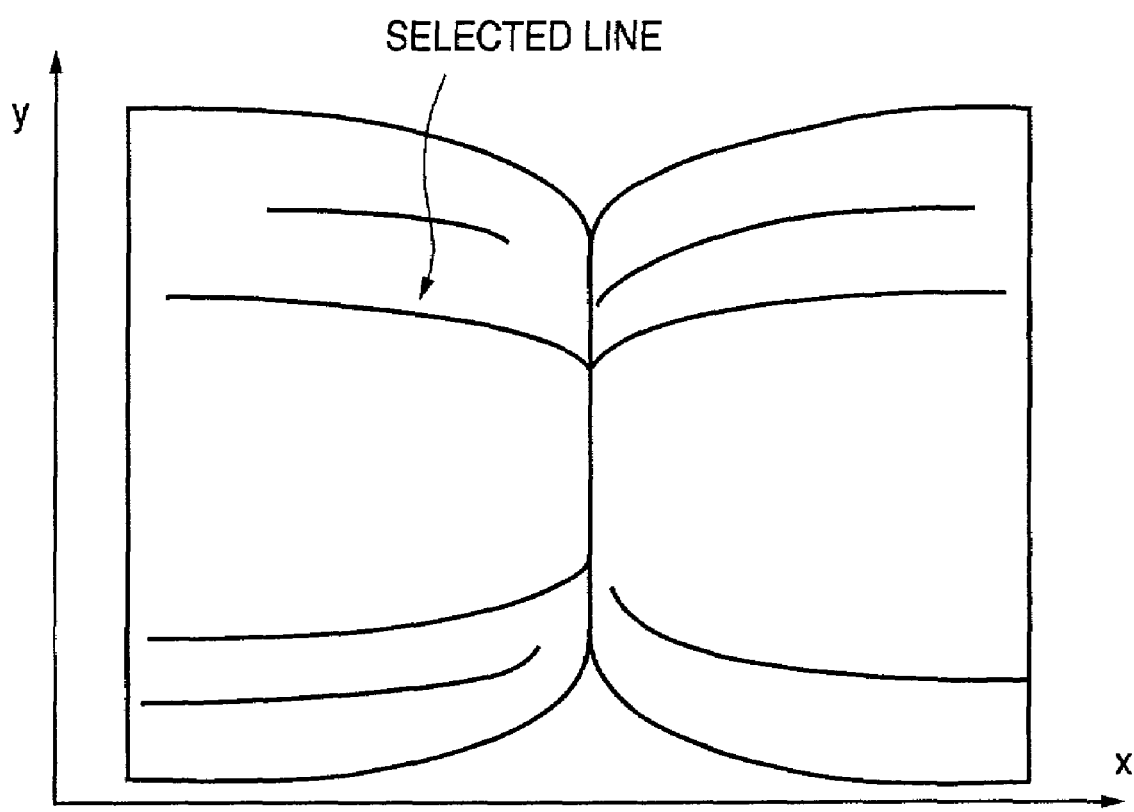
FIG. 27 shows the fifth embodiment of the selection of the reference ruled line according to the present invention.

FIG. 27 shows the fifth embodiment of the selection of the reference ruled line according to the present invention. In this embodiment, first, ruled lines each of which has a length longer than a length of a predetermined ratio to that of the longest ruled line are selected out of a plurality of ruled lines. Then, one ruled line having the largest curvature out of the selected ruled lines is selected for the reference ruled line.

Figure 28:
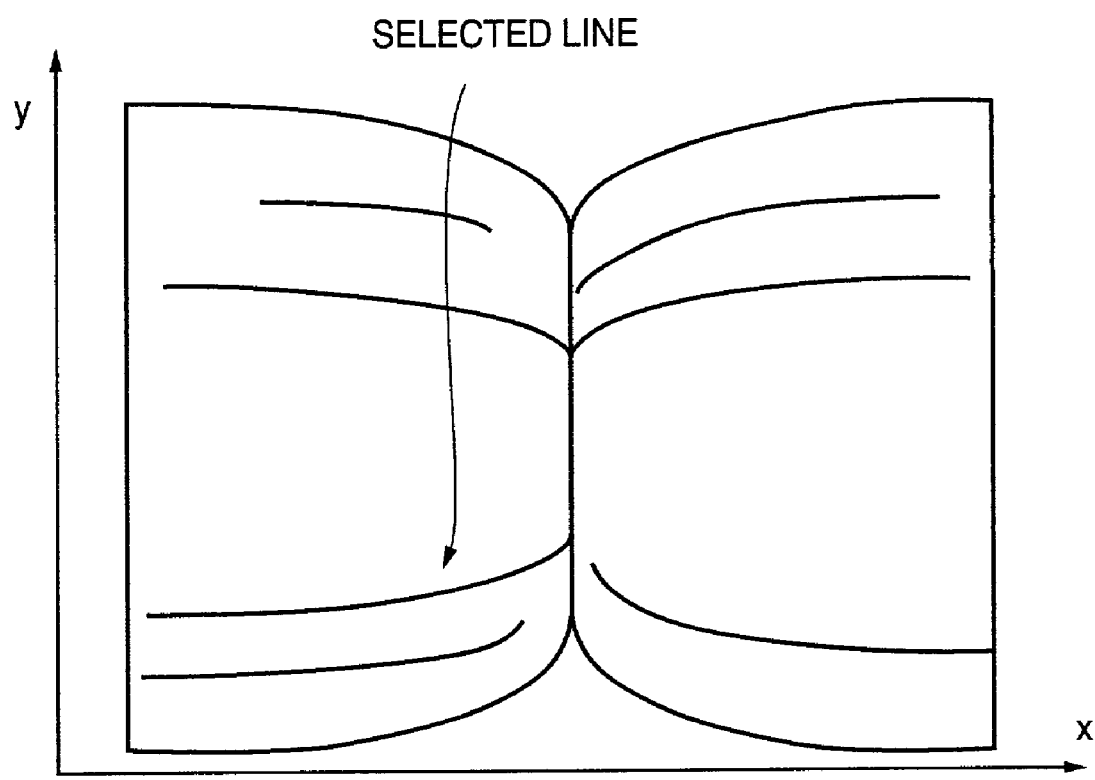
FIG. 28 shows the sixth embodiment of the selection of the reference ruled line according to the present invention.

FIG. 28 shows the sixth embodiment of the selection of the reference ruled line according to the present invention. In this embodiment, first, ruled lines each of which has a length longer than a length of a predetermined ratio to that of the longest ruled line are selected out of a plurality of ruled lines. Then, one ruled line placed nearest the upper edge of the scanned image out of the selected ruled lines is selected for the reference ruled line.

Figure 29:
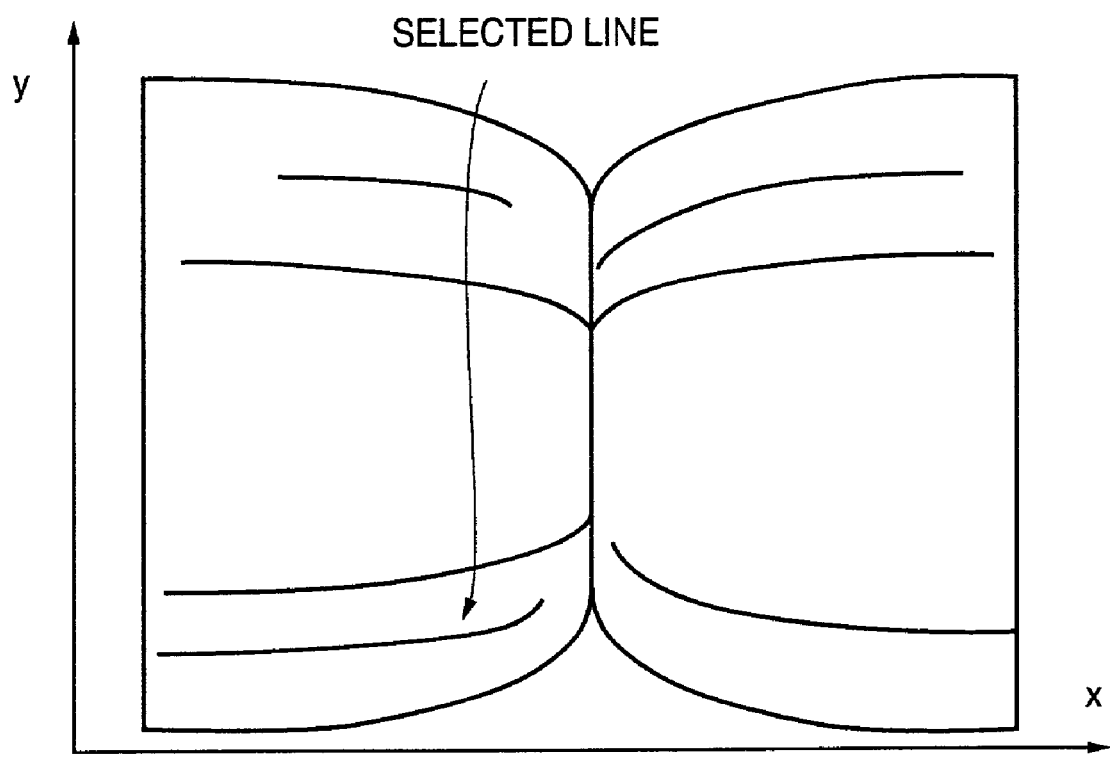
FIG. 29 shows the seventh embodiment of the selection of the reference ruled line according to the present invention.

FIG. 29 shows the seventh embodiment of the selection of the reference ruled line according to the present invention. In this embodiment, first, ruled lines each of which has a length longer than a length of a predetermined ratio to that of the longest ruled line are selected out of a plurality of ruled lines. Then, one ruled line placed nearest the lower edge of the scanned image out of the selected ruled lines is selected for the reference ruled line.

Figure 30:
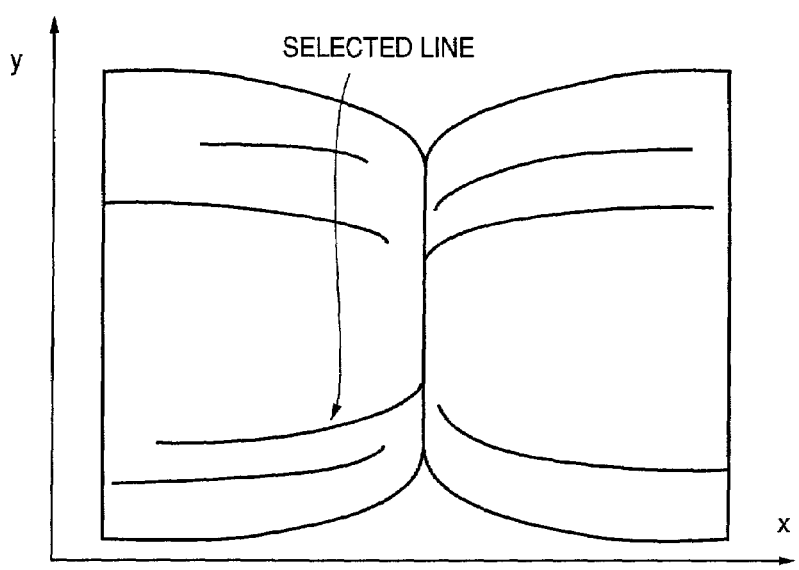
FIG. 30 shows the eighth embodiment of the selection of the reference ruled line according to the present invention.

FIG. 30 shows the eighth embodiment of the selection of the reference ruled line according to the present invention. In this embodiment, first, ruled lines each of which has a length longer than a length of a predetermined ratio to that of the longest ruled line are selected out of a plurality of ruled lines. Then, one ruled line placed nearest the binding part of a book type original out of the selected ruled lines is selected for the reference ruled line.

In the foregoing specification, the invention has been described with reference to specific embodiments in which the image distortion correction unit is provided in the digital copy machine 16 as the digital image forming apparatus and an distorted image scanned by the scanner part 1 is corrected. However, it should be noted that the present invention is not limited to these embodiments. It will be evident that various modifications and changes may be made without departing from the spirit and scope of the invention. For example, an image scanner which has an image reading means for an original may be connected to a personal computer and the personal computer loads a program stored on the CD-ROM 37 into the HDD in the personal computer. This construction achieves an image distortion correction unit which operate as mentioned above. It is also possible to correct the distorted image, which has been already scanned by another scanner, by means of the personal computer of which the program stored on the CD-ROM 37 is loaded into the HDD.

The present application is based on Japanese priority application No. 2000-379895 filed on Dec. 14, 2000, Japanese priority application No. 2001-101279 filed on Mar. 30, 2001, and Japanese priority application No. 2001-374490 filed on Dec. 7, 2001, the entire contents of which are hereby incorporated by reference.

What is claimed is:

1. An image distortion correction apparatus comprising:
    a circumscribed rectangle extraction unit which extracts a circumscribed rectangle for each character in a distorted image scanned by an image reading unit to read an original placed on a reference plane;
    a character string extraction unit which extracts character strings using said circumscribed rectangles extracted by said circumscribed rectangle extraction unit;
    a distance estimation unit which estimates a distance between said reference plane and said original using said character strings; and
    an image distortion correction unit which corrects said distorted image based on said distance between said reference plane and said original estimated by said image distortion correction unit.

2. The image distortion correction apparatus as claimed in claim 1 further comprising:
    an original distinction unit which decides whether said original is written horizontally or vertically, wherein in case that said original distinction unit decides that said original is written in the horizontal,
    said distance estimation unit first, selects character strings each of which has a length longer than a length of a predetermined ratio to that of the longest string out of a plurality of character strings in said distorted image, then, selects one string having the largest curvature out of said selected character strings for a reference character string, and then, estimates a distance between said reference plane and said original using said reference string.

3. The image distortion correction apparatus as claimed in claim 2, wherein said curvature is measured based on the location of the center coordinates in a main scanning direction of the circumscribed rectangle in the character string, and the larger a difference between a maximum value of said center coordinates and a minimum value of said center coordinates, the larger is the said curvature.

4. The image distortion correction apparatus as claimed in claim 1 further comprising:
    an original distinction unit which decides whether said original is written horizontally or vertically, wherein in case that said original distinction unit decides that said original is written in the vertical,
    said character string extraction unit extracts a reference character string using circumscribed rectangles either at a top of or at a bottom of each vertical line,
    said distance estimation unit estimates a distance between said reference plane and said original using said reference string.

5. The image distortion correction apparatus as claimed in claim 2, wherein
    said distance estimation unit measures both a first distance D1 between a prolonged line of a line part in said reference character string and a curve part in said reference character string and a second distance D2 between an imaging center line and said curve part in said reference character string, and estimates a distance D between said reference plane and said original based on $D=R\times(D1/D2)$, where R is a distance between said reference plane and a center of a lens.

6. The image distortion correction apparatus as claimed in claim 3, wherein
    said distance estimation unit measures both a first distance D1 between a prolonged line of a line part in said reference character string and a curve part in said reference character string and a second distance D2 between an imaging center line and said curve part in said reference character string, and estimates a distance D between said reference plane and said original based on $D=R\times(D1/D2)$, where R is a distance between said reference plane and a center of a lens.

7. The image distortion correction apparatus as claimed in claim 4, wherein
    said distance estimation unit measures both a first distance D1 between a prolonged line of a line part in said reference character string and a curve part in said reference character string and a second distance D2 between an imaging center line and said curve part in said reference character string, and estimates a distance D between said reference plane and said original based on $D=R\times(D1/D2)$, where R is a distance between said reference plane and a center of a lens.

8. The image distortion correction apparatus as claimed in claim 1, wherein
    said distance estimation unit independently estimates each distance between said reference plane and said original for a left page and a right page.

9. An image distortion correction apparatus comprising:
    a ruled line extraction unit which extracts a ruled lines in a distorted image scanned by an image reading unit to read an original placed on a reference plane;
    a distance estimation unit which estimates a distance between said reference plane and said original using said ruled lines; and
    an image distortion correction unit which corrects said distorted image based on said distance between said reference plane and said original estimated by said image distortion correction unit.

10. The image distortion correction apparatus as claimed in claim 9 further comprising:
    an original distinction unit which decides whether said original is written horizontally or vertically, wherein in case that said original distinction unit decides that said original is written in the horizontal,
    said distance estimation unit first, selects ruled lines each of which has a length longer than a length of a predetermined ratio to that of the longest ruled line out of a plurality of ruled lines in said distorted image, then, selects one ruled line placed nearest an upper edge or a lower edge of the scanned image out of said selected ruled lines for a reference ruled line, and then, estimates a distance between said reference plane and said original using said reference ruled line.

11. The image distortion correction apparatus as claimed in claim 10, wherein
said distance estimation unit measures both a first distance D1 between a prolonged line of a line part in said reference ruled line and a curve part in said reference ruled line and a second distance D2 between an imaging center line and said curve part in said reference ruled line, and estimates a distance D between said reference plane and said original based on $$D=R\times(D1/D2),$$

where R is a distance between said reference plane and a center of a lens.

12. The image distortion correction apparatus as claimed in claim 9, wherein
said distance estimation unit independently estimates each distance between said reference plane and said original for a left page and a right page.

13. A computer readable recording media having a program to execute an image distortion correction method, said program comprising steps of:
a circumscribed rectangle extraction step for extracting a circumscribed rectangle for each character in a distorted image scanned by an image reading step to read an original placed on a reference plane;
a character string extraction step for extracting character strings using said circumscribed rectangles extracted by said circumscribed rectangle extraction step;
a distance estimation step for estimating a distance between said reference plane and said original using said character strings; and
an image distortion correction step for correcting said distorted image based on said distance between said reference plane and said original estimated by said image distortion correction step.

14. The computer readable recording media as claimed in claim 13 further comprising:
an original distinction step which decides whether said original is written horizontally or vertically, wherein in case that said original distinction step decides that said original is written in the horizontal,
said distance estimation step first, selects character strings each of which has a length longer than a length of a predetermined ratio to that of the longest string out of a plurality of character strings in said distorted image, then, selects one string having the largest curvature out of said selected character strings for a reference character string, and then, estimates a distance between said reference plane and said original using said reference string.

15. The computer readable recording media as claimed in claim 14, wherein said curvature is measured based on a location of center coordinates in a main scanning direction of the circumscribed rectangle in the character string, and the larger a difference between a maximum value of said center coordinates and a minimum value of said center coordinates, the larger is the said curvature.

16. The computer readable recording media as claimed in claim 13 further comprising:
an original distinction step for deciding whether said original is written horizontally or vertically, wherein in case that said original distinction step decides that said original is written in the vertical,
said character string extraction step extracts a reference character string using circumscribed rectangles either at a top of or at a bottom of each vertical line,
said distance estimation step estimates a distance between said reference plane and said original using said reference string.

17. The computer readable recording media as claimed in claim 14, wherein
said distance estimation step measures both a first distance D1 between a prolonged line of a line part in said reference character string and a curve part in said reference character string and a second distance D2 between an imaging center line and said curve part in said reference character string, and estimates a distance D between said reference plane and said original based on $$D=R\times(D1/D2),$$

where R is a distance between said reference plane and a center of a lens.

18. The computer readable recording media as claimed in claim 15, wherein
said distance estimation step measures both a first distance D1 between a prolonged line of a line part in said reference character string and a curve part in said reference character string and a second distance D2 between an imaging center line and said curve part in said reference character string, and estimates a distance D between said reference plane and said original based on $$D=R\times(D1/D2),$$

where R is a distance between said reference plane and a center of a lens.

19. The computer readable recording media as claimed in claim 16, wherein
said distance estimation step measures both a first distance D1 between a prolonged line of a line part in said reference character string and a curve part in said reference character string and a second distance D2 between an imaging center line and said curve part in said reference character string, and estimates a distance D between said reference plane and said original based on $$D=R\times(D1/D2),$$

where R is a distance between said reference plane and a center of a lens.

20. The computer readable recording media as claimed in claim 13, wherein
said distance estimation step independently estimates each distance between said reference plane and said original for a left page and a right page.

21. A computer readable recording media having a program to execute an image distortion correction method, said program comprising steps of:
a ruled line extraction step for extracting ruled lines in a distorted image scanned by an image reading step to read an original placed on a reference plane;
a distance estimation step for estimating a distance between said reference plane and said original using said ruled lines; and
an image distortion correction step for correcting said distorted image based on said distance between said reference plane and said original estimated by said image distortion correction step.

22. The computer readable recording media as claimed in claim 21 further comprising:
an original distinction step for deciding whether said original is written horizontally or vertically, wherein in case that said original distinction step decides that said original is written in the horizontal, said distance estimation step first, selects ruled lines each of which has a length longer than a length of a predetermined ratio to that of the longest ruled line out of a plurality of ruled lines in said distorted image, then, selects one ruled line placed nearest an upper edge or a lower edge of the scanned image out of said selected ruled lines for a reference ruled line, and then, estimates a distance between said reference plane and said original using said reference ruled line.

23. The computer readable recording media as claimed in claim 22, wherein said distance estimation step measures both a first distance D1 between a prolonged line of a line part in said reference ruled line and a curve part in said reference ruled line and a second distance D2 between an imaging center line and said curve part in said reference ruled line, and estimates a distance D between said reference plane and said original based on $$D = R \times (D1/D2),$$

where R is a distance between said reference plane and a center of a lens.

24. The computer readable recording media as claimed in claim 21, wherein said distance estimation step independently estimates each distance between said reference plane and said original for a left page and a right page.

25. An image distortion correction method comprising steps of:

a circumscribed rectangle extraction step for extracting a circumscribed rectangle for each character in a distorted image scanned by an image reading step to read an original placed on a reference plane;

a character string extraction step for extracting character strings using said circumscribed rectangles extracted by said circumscribed rectangle extraction step;

a distance estimation step for estimating a distance between said reference plane and said original using said character strings; and an image distortion correction step for correcting said distorted image based on said distance between said reference plane and said original estimated by said image distortion correction step.

26. An image distortion correction method comprising steps of:

a ruled line extraction step for extracting ruled lines in a distorted image scanned by an image reading unit to read an original placed on a reference plane;

a distance estimation step for estimating a distance between said reference plane and said original using said ruled lines; and an image distortion correction step for correcting said distorted image based on said distance between said reference plane and said original estimated by said image distortion correction step.

27. An image scanner comprising:

an image reading unit to read an original placed on a reference plane; and an image distortion correction apparatus comprising;

a circumscribed rectangle extraction unit which extracts a circumscribed rectangle for each character in a distorted image scanned by said image reading unit;

a character string extraction unit which extracts character strings using said circumscribed rectangles extracted by said circumscribed rectangle extraction unit;

a distance estimation unit which estimates a distance between said reference plane and said original using said character strings; and an image distortion correction unit which corrects said distorted image based on said distance between said reference plane and said original estimated by said image distortion correction unit.

28. An image scanner comprising:

an image reading unit to read an original placed on a reference plane; and an image distortion correction apparatus comprising;

a ruled line extraction unit which extracts ruled lines in a distorted image scanned by said image reading unit;

a distance estimation unit which estimates a distance between said reference plane and said original using said ruled lines; and an image distortion correction unit which corrects said distorted image based on said distance between said reference plane and said original estimated by said image distortion correction unit.

29. An image forming apparatus comprising:

an image reading unit to read an original placed on a reference plane;

an image distortion correction apparatus comprising;

a circumscribed rectangle extraction unit which extracts a circumscribed rectangle for each character in a distorted image scanned by said image reading unit;

a character string extraction unit which extracts character strings using said circumscribed rectangles extracted by said circumscribed rectangle extraction unit;

a distance estimation unit which estimates a distance between said reference plane and said original using said character strings; and an image distortion correction unit which corrects said distorted image based on said distance between said reference plane and said original estimated by said image distortion correction unit; and, a printing unit which prints said corrected image supplied from said image distortion correction apparatus on a paper.

30. An image forming apparatus comprising:

an image reading unit to read an original placed on a reference plane;

an image distortion correction apparatus comprising;

a ruled line extraction unit which extracts ruled lines in a distorted image scanned by said image reading unit;

a distance estimation unit which estimates a distance between said reference plane and said original using said ruled lines; and an image distortion correction unit which corrects said distorted image based on said distance between said reference plane and said original estimated by said image distortion correction unit; and a printing unit which prints said corrected image supplied from said image distortion correction apparatus on a paper.

* * * * *